United States Patent
Satori et al.

(10) Patent No.: US 9,488,246 B2
(45) Date of Patent: Nov. 8, 2016

(54) LIQUID SEALED VIBRATION ISOLATING DEVICE

(71) Applicants: YAMASHITA RUBBER KABUSHIKI KAISHA, Fujimino-shi, Saitama (JP); HONDA MOTOR CO., LTD., Tokyo (JP)

(72) Inventors: Kazutoshi Satori, Fujimino (JP); Teruyuki Hirokawa, Fujimino (JP); Yuuichi Nakamaru, Fujimino (JP); Atsushi Komatsu, Wako (JP)

(73) Assignees: YAMASHITA RUBBER KABUSHIKI KAISHA, Fujimino-Shi (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/653,997

(22) PCT Filed: Dec. 18, 2013

(86) PCT No.: PCT/JP2013/083941
§ 371 (c)(1),
(2) Date: Jun. 19, 2015

(87) PCT Pub. No.: WO2014/098147
PCT Pub. Date: Jun. 26, 2014

(65) Prior Publication Data
US 2015/0330476 A1  Nov. 19, 2015

(30) Foreign Application Priority Data

Dec. 20, 2012 (JP) ................. 2012-278761

(51) Int. Cl.
| | | |
|---|---|---|
| F16F 5/00 | (2006.01) |
| F16F 13/10 | (2006.01) |
| F16F 13/08 | (2006.01) |
| B60K 5/12 | (2006.01) |

(52) U.S. Cl.
CPC ............ *F16F 13/10* (2013.01); *B60K 5/1208* (2013.01); *F16F 13/08* (2013.01); *F16F 13/106* (2013.01); *F16F 13/107* (2013.01)

(58) Field of Classification Search
CPC ..... F16F 13/105; F16F 13/106; F16F 13/107
USPC .................................................... 267/140.13
See application file for complete search history.

(56) References Cited

U.S. PATENT DOCUMENTS

| | | | |
|---|---|---|---|
| 2008/0284075 A1* | 11/2008 | Saito .................... | F16F 13/105 267/140.13 |
| 2010/0072683 A1 | 3/2010 | Saito et al. | |
| 2011/0101581 A1 | 5/2011 | Kubo et al. | |
| 2012/0049423 A1 | 3/2012 | Ishikawa et al. | |
| 2012/0299229 A1 | 11/2012 | Kubo et al. | |

OTHER PUBLICATIONS

International Search Report, Date of mailing: Jan. 28, 2014.

* cited by examiner

*Primary Examiner* — Nicholas J Lane
(74) *Attorney, Agent, or Firm* — Rankin, Hill & Clark LLP

(57) ABSTRACT

An elastic partition member located in the partition member is integrally provided with a relief valve that opens and closes a leak passage to suppress the generation of the cavitation phenomenon. A pair of relief valves is formed in a crescent shape on the outer circumferential side of the movable diaphragm section in opposed relation. The crescent shape of the relief valve is formed by an inner circumferential side of elliptical arc shape and an outer circumferential side of circular arc shape. A valve length of the relief valve varies in the longitudinal direction such that a middle portion in the longitudinal direction is largest. is easily deformed when the extraordinary vibration is inputted. Each end portion in the longitudinal direction of the relief valve is short in valve length and high in rigidity whereby to prevent the leak when the normal vibration is inputted.

10 Claims, 16 Drawing Sheets

Fig.11
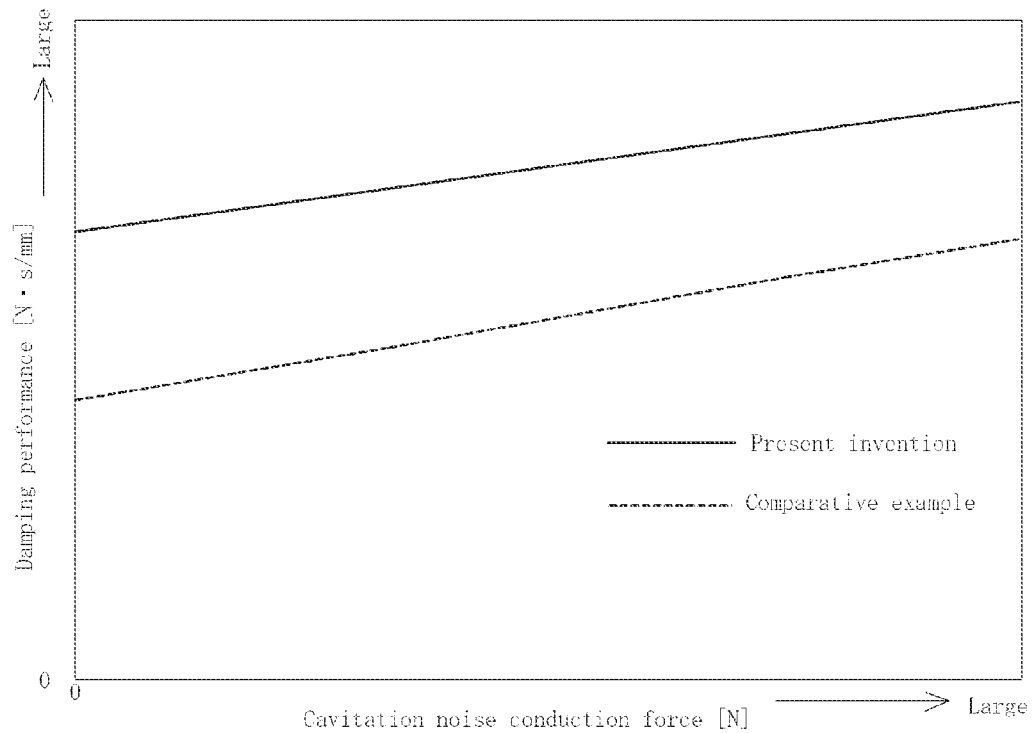
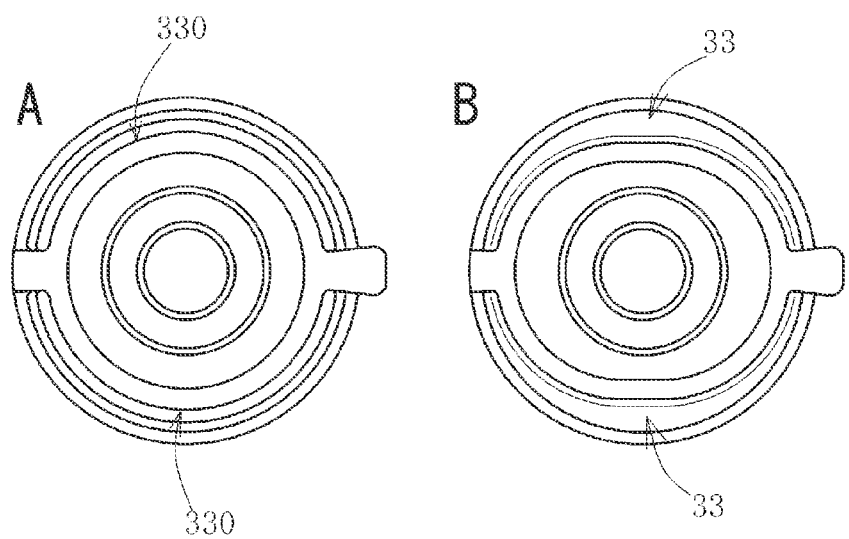

Fig.12
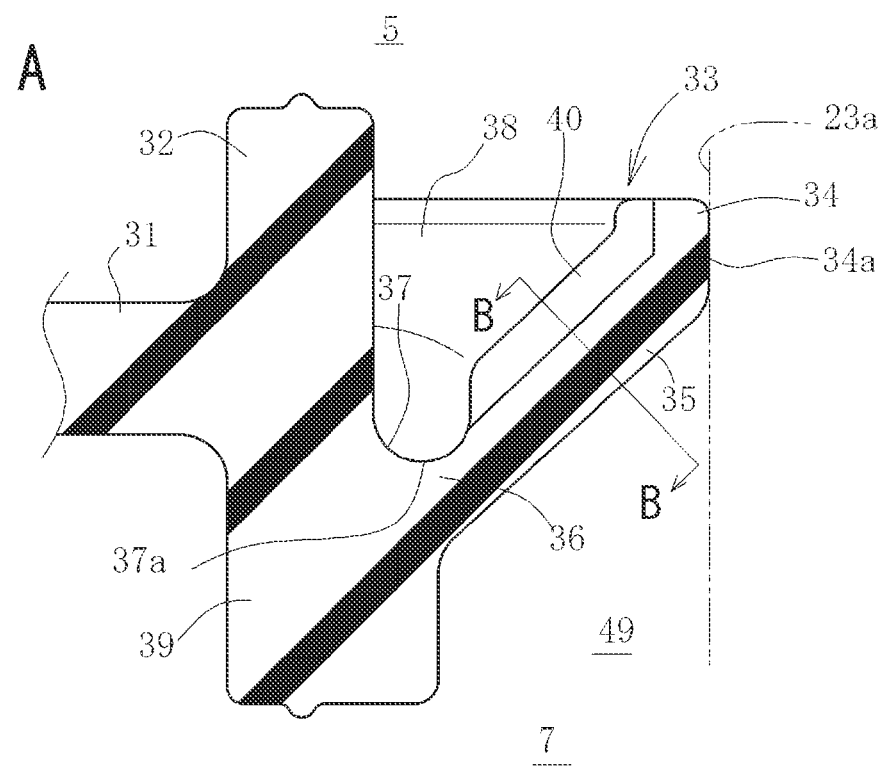
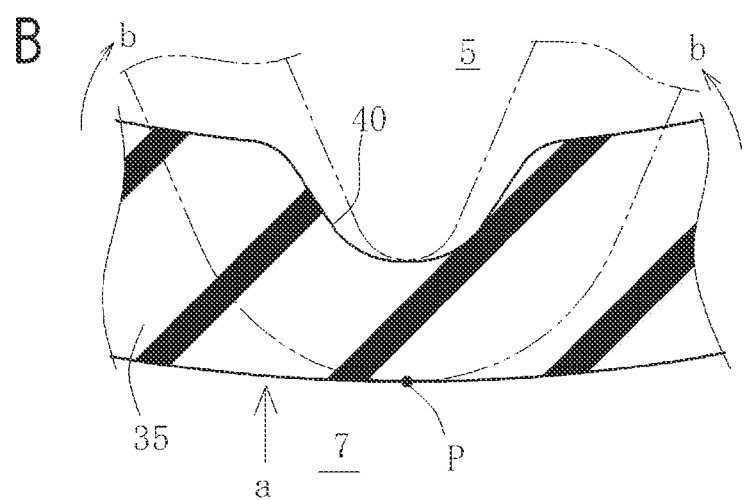

Fig.13
A
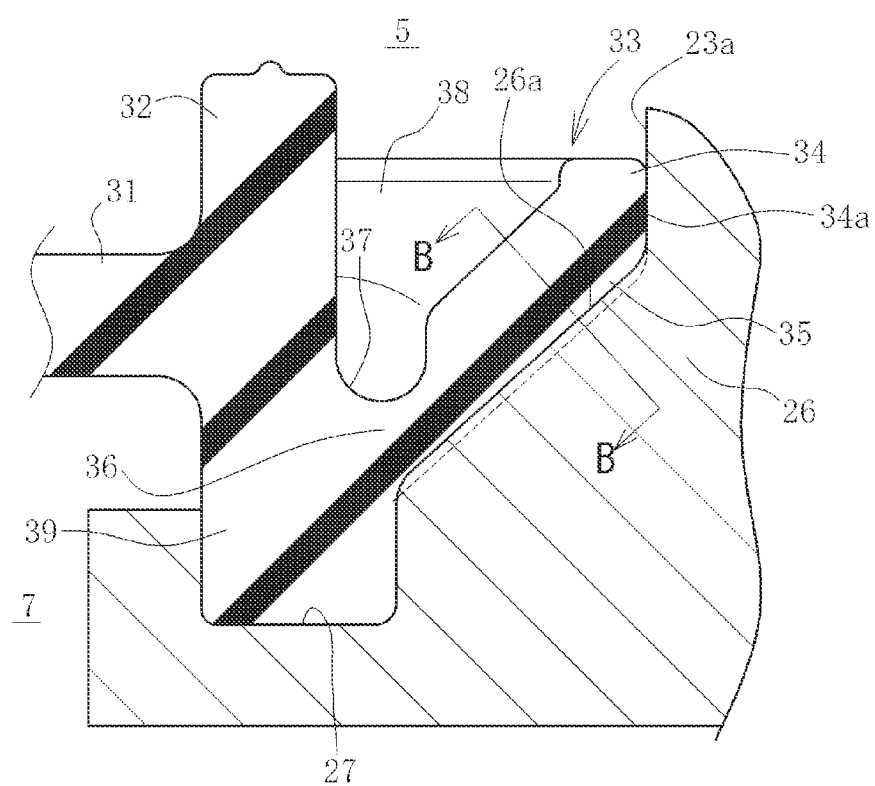
B
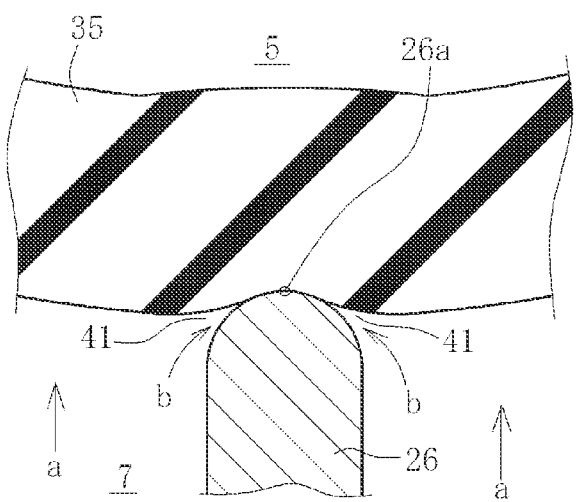

LIQUID SEALED VIBRATION ISOLATING DEVICE

TECHNICAL FIELD

The present invention relates to a liquid sealed vibration isolating device for use in an engine mount for a motor vehicle, and more particularly, to the device capable of effectively decreasing noises produced by a cavitation phenomenon and of realizing high damping.

BACKGROUND ART

In a liquid sealed vibration isolating device of this kind, when an extraordinary excessive amplitude vibration is inputted, there may be cases where negative pressure is developed instantaneously within a primary liquid chamber, and then, there is produced cavitation by which a part of hydraulic liquid bubbles. Since this cavitation involves generation of a considerable noise, it is required to prevent this noise, and there are proposed various kinds of constructions for noise prevention.

As one of them, there is proposed the construction that has a movable diaphragm section which is provided in a part of a partition member, and a circular arc shaped relief valve which is integrally provided in an outer peripheral portion of the movable diaphragm section. In this construction, when a normal vibration (a vibration within a range that is assumed at the time of normal traveling and the like) is inputted, a leak passage provided in the partition member is closed, and when an extraordinary vibration is inputted, the relief valve is opened so that a large amount of the hydraulic liquid is leaked from a secondary liquid chamber to a primary liquid chamber (see a patent reference 1).

Herein, the extraordinary vibration is an excessive amplitude vibration such as to produce the cavitation, and is the vibration which is not produced ordinarily at the time of the normal traveling and the like.

PRIOR ART REFERENCE

Patent reference 1: Japanese Patent Application Laid Open Publication JP 2009-52675 A.

DISCLOSURE OF THE INVENTION

Problem to be Solved by the Invention

By the way, the above described relief valve, in the case where the input vibration is within the normal range, is required to close the leak passage fluid-tightly so as not to leak the hydraulic liquid, whereby to ensure the high damping due to liquid column resonance of the orifice passage. Therefore, it is necessary to prevent such deformation (hereinafter, referred to as "valve opening deformation") as to open the valve by the normal vibration input, and it is necessary to increase the rigidity of the relief valve as high as possible in order for maintaining a fluid-tight condition so as to prevent the leak of the hydraulic liquid.

On the other hand, when the extraordinary vibration is inputted, it is necessary to open the relief valve largely within a short period of time whereby to leak as large an amount of the hydraulic liquid as possible instantaneously.

For this reason, the relief valve is required to have such valve opening easiness that it is easily opened at the time of inputting the extraordinary vibration and it can be quickly deformed in the opening direction to ensure a large opening area. However, since the increase in rigidity and the valve opening easiness are contrary to each other, it is required that these properties are balanced and the relief valve has both the rigidity such as not to be deformed at the time of the normal vibration input in order to prevent the leak and the valve opening easiness such as to be quickly deformed at the time of the extraordinary vibration input in order to enable a large amount of leak.

Further, in order to enable the large amount of leak at the time of having opened the relief valve, it is conceivable that the leak passage is formed long in the circumferential direction along the outer peripheral portion of the movable diaphragm section.

However, according to this method, the relief valve also must be formed long in the circumferential direction of the movable diaphragm section together with the leak passage, and, since the rigidity of the relief valve is lowered with increase in length, the high rigidity must be maintained over the full length so that the valve opening easiness may be easily injured. Therefore, when the relief valve is lengthened, the provision of both the rigidity and the valve opening easiness becomes more important.

Further, it is to be avoided that an area of the movable valve section provided at the inside of the relief valve is decreased by enlarging the opening area of the leak passage to thereby deteriorate hydraulic pressure absorption performance and that the compactification of the device is injured by increasing an outer diameter of the partition member the other way around.

Therefore, the present invention aims at realization of the above requirements.

Means for Solving the Problem

To solve the above described problem, a liquid sealed vibration isolating device according to a first feature of the present invention comprises a liquid chamber using an elastic insulator (3) as a part of its wall and being filled with hydraulic liquid, a partition member (6) partitioning the liquid chamber into a primary liquid chamber (5) and a secondary liquid chamber (7), an orifice passage (8) communicating through the partition member (6) between the primary liquid chamber (5) and the secondary liquid chamber (7), and an elastic partition member (30) being provided in the partition member (6), the elastic partition member (30) being integrally provided with an movable diaphragm section (31) at a central portion thereof so as to absorb hydraulic pressure fluctuation of the primary liquid chamber (5) and a relief valve (33) at an outer peripheral portion thereof so as to open and close a leak passage (49) provided in the partition member (6), the relief valve (33) being configured to be opened when an extraordinary vibration is inputted, so as to leak the hydraulic liquid from the leak passage (49) to the primary liquid chamber (5) to suppress generation of cavitation, wherein the relief valve (33) is formed along a circumferential direction of the outer peripheral portion of the elastic partition member (30) and includes a valve recess (38) which is open to the primary liquid chamber (5) side and an inclined surface wall (35) which forms an outer peripheral wall of the valve recess (38), and wherein a valve length which is a length in the radial direction of the inclined surface wall (35) varies in the longitudinal direction of the relieve valve (33) in such a manner that it is greatest at a middle portion (P) in the longitudinal direction of the relief valve (33).

According to a second feature of the present invention, in addition to the first feature, an opening width of the recess

(33) varies in the longitudinal direction of the relief valve (33) in such a manner that it is largest at a middle portion (P) in the longitudinal direction of the relief valve (33).

According to a third feature of the present invention, in addition to the first or second feature, the relief valve (33) has a crescent shape in a plan view of the elastic partition member (30).

Herein, the crescent shape is an elongated shape formed by a combination of two inner and outer curved lines in such a configuration that an interval between the two curved lines is widest at a middle portion in the longitudinal direction and gradually narrowed toward each end in the longitudinal direction so as to be closed at each end in the longitudinal direction. The crescent shape is formed by making a curvature of the inner curved line smaller than a curvature of the outer curved line, for instance.

According to a fourth feature of the present invention, in addition to any one of the first to third feature, the relief valve (33) is formed of two different curved lines one of inner and outer circumferential sides of which is an elliptic arc and the other of the inner and outer circumferential sides of which is a circular arc, in a plan view of the elastic partition member (30).

According to a fifth feature of the present invention, in addition to any one of the first to fourth features, the movable diaphragm section (31) of the elastic partition member (30) is of non-circular shape.

According to a sixth feature of the present invention, in addition to any one of the first to fifth features, the relief valve (33) has about a half length of the full circumference of the outer peripheral portion of the elastic partition member (30) and is arranged in pairs in symmetrical fashion with respect to a center of the elastic partition member (30).

According to a seventh feature of the present invention, in addition to the first to fifth features, the elastic partition member (30) includes a thick fixing section (32) provided for fixing the outer peripheral portion of the movable diaphragm section (31). An outer circumferential part of the fixing section (32) defines a valve region (50) in which the relief valve (33) is formed. A valve non-forming part (51) is arranged in the vicinity of each end in the circumferential direction of the relief valve (33) in the valve region (50), and an elastic force adjustment section (52) for adjusting elastic force of the valve non-forming part (51) is provided in the valve non-forming part (51)

According to an eighth feature of the present invention, in addition to any one of the first to seventh features, a radial groove (40) which is open to the primary liquid chamber (5) and extends in the radial direction is provided in a surface of the inclined surface wall (35) facing the primary liquid chamber (5).

According to a ninth feature of the present invention, in addition to any one of the first to eighth features, a surface of the inclined surface wall (35) located on the secondary liquid chamber (7) side is supported by a stopper (26) formed within the leak passage (49), and the stopper (26) is configured to push forward the inclined surface wall (35) through a supporting portion thereof in the direction of the primary liquid chamber (5) in an initial position thereof.

According to a tenth feature of the present invention, in addition to any one of the first to ninth features, the elastic partition member (30) includes a thick fixing section (32) for fixing the outer peripheral portion of the movable diaphragm section (31). The inclined surface wall (35) of the relief valve (33) extends integrally and outwardly in the radial direction from the fixing section (32) and has a base section (36) which is connected to the fixing section (32) of the incline surface wall (35). A circumferential groove (37) of arc shape extending in the longitudinal direction is formed in a surface on the primary liquid chamber (5) side of the base section (36). There is provided a fixing base portion (39) which is thicker than the fixing section (32) and connected continuously integral with the fixing section (32). The fixing base portion (39) extends from the base section (36) to the secondary liquid chamber (7) side. An outer circumferential surface (39a) of the fixing base portion (39) is located outwardly in the radial direction with respect to a bottom center (37a) of the circumferential groove (37).

Effects of the Invention

According to the first feature, since the valve length varies in the longitudinal direction of the relieve valve in such a manner that it is largest at the middle portion in the longitudinal direction of the relief valve, the middle portion in the longitudinal direction of the relief valve is most deformable to be opened quickly from this part. Moreover, the valve length at each end portion in the longitudinal direction is shortened so that the relief valve is hard to be deformed at the end portions in the longitudinal direction thereof whereby to increase the rigidity.

Accordingly, the increase in rigidity and the valve opening easiness which are contrary to each other are balanced and the relief valve has both the rigidity such as not to be deformed at the time of the normal vibration input in order to prevent the leak and the valve opening easiness such as to be quickly deformed at the time of the extraordinary vibration input in order to make possible a large amount of leak.

According to the second feature of the present invention, since the opening width of the recess varies in the longitudinal direction of the relief valve in such a manner that it is largest at the middle portion in the longitudinal direction of the relief valve, the valve length in the longitudinal direction of the relief valve 33 can be varied in such a manner that the middle portion in the longitudinal direction thereof becomes greatest.

According to the third feature of the present invention, since the relief valve 33 has a crescent shape in a plan view of the elastic partition member 30, the opening width and the valve length can be varied in the longitudinal direction of the relief valve 33 in such a manner that the middle portion in the longitudinal direction thereof becomes greatest.

According to the fourth feature of the present invention, the relief valve 33 is formed of two different curved lines one of inner and outer circumferential sides of which is an elliptic arc and the other of the inner and outer circumferential sides of which is a circular arc, in a plan view of the elastic partition member 30. Therefore, the relief valve can be formed in the crescent shape in a plan view.

According to the fifth feature of the present invention, since the movable diaphragm section is of non-circular shape, the movable diaphragm section can have an area necessary for the hydraulic pressure absorption, the relief valve with a longer valve length can be arranged by utilizing a relatively wide space formed between the non-circular outer peripheral portion of the movable diaphragm section and the outer circumference of the elastic partition member. Therefore, the hydraulic pressure absorption performance of the movable diaphragm section can be maintained at a predetermined level, and the movable diaphragm section can be arranged integral with the relief valve of which the valve length varies in the longitudinal direction. In addition, the device can maintain a compact external form thereof without increasing in size of the whole device.

According to the sixth feature of the present invention, since the relief valve has about a half length of the full circumference of the outer peripheral portion of the elastic partition member and is arranged in pairs in symmetrical fashion with respect to the center the elastic partition member, each of the relief valves can be formed as long as possible, and the opening area at the time of opening the relief valve can be widened so as to enable the large amount of the leak when the relief valve is opened.

According to the seventh feature of the present invention, the valve non-forming part is arranged in the vicinity of each end portion in the circumferential direction of the relief valve in the valve region, and the elastic force adjustment section is provided in the valve non-forming part. Therefore, when the valve region is fitted into the leak passage, the generation of the elastic reaction force of the valve non-forming part can be suppressed by the elastic force adjustment section so as to prevent unnecessary yielding of the movable diaphragm section, so that the deterioration of the damping force can be prevented.

According to the eighth feature of the present invention, the radial groove which is open to the primary liquid chamber and extends in the radial direction is provided in the surface of the inclined surface wall facing the primary liquid chamber. Therefore, when the extraordinary vibration is inputted, the inclined surface wall is bent at the radial groove. Thus, the relief valve is flexible whereby to improve the valve opening easiness.

According to the ninth feature of the present invention, the stopper for supporting the surface of the inclined surface wall located on the secondary liquid chamber is configured to push forward the inclined surface wall in the direction of the primary liquid chamber (5) in the initial position thereof. Therefore, when the extraordinary vibration is inputted, the inclined surface wall is bent from the supporting portion of the stopper. Thus, the relief valve is flexible whereby to facilitate the valve opening easiness.

According to the tenth feature of the present invention, the relief valve becomes flexible to be bent at the circumferential groove formed of a recessed groove of arc shape in the base section of the relief valve, whereby the valve opening easiness of the relief valve at the time of inputting the extraordinary vibration can be facilitated. In addition, the outer circumferential surface of the thick fixing base portion continuously connected to the fixing section is located outwardly in the radial direction with respect to the bottom center of the circumferential groove, it is possible to optimize the balance between the rigidity for suppressing the leak at the time of the normal vibration input and the flexibility at the time of the extraordinary vibration input.

BRIEF DESCRIPTION OF THE DRAWINGS

FIG. 11 is a graph indicating a dynamic spring characteristic;

FIG. 12 is a cross sectional view of the relief valve in a modified form;

FIG. 13 is a cross sectional view of the relief valve in another modified form;

BEST MODE FOR CARRYING OUT THE INVENTION

Figure 1:
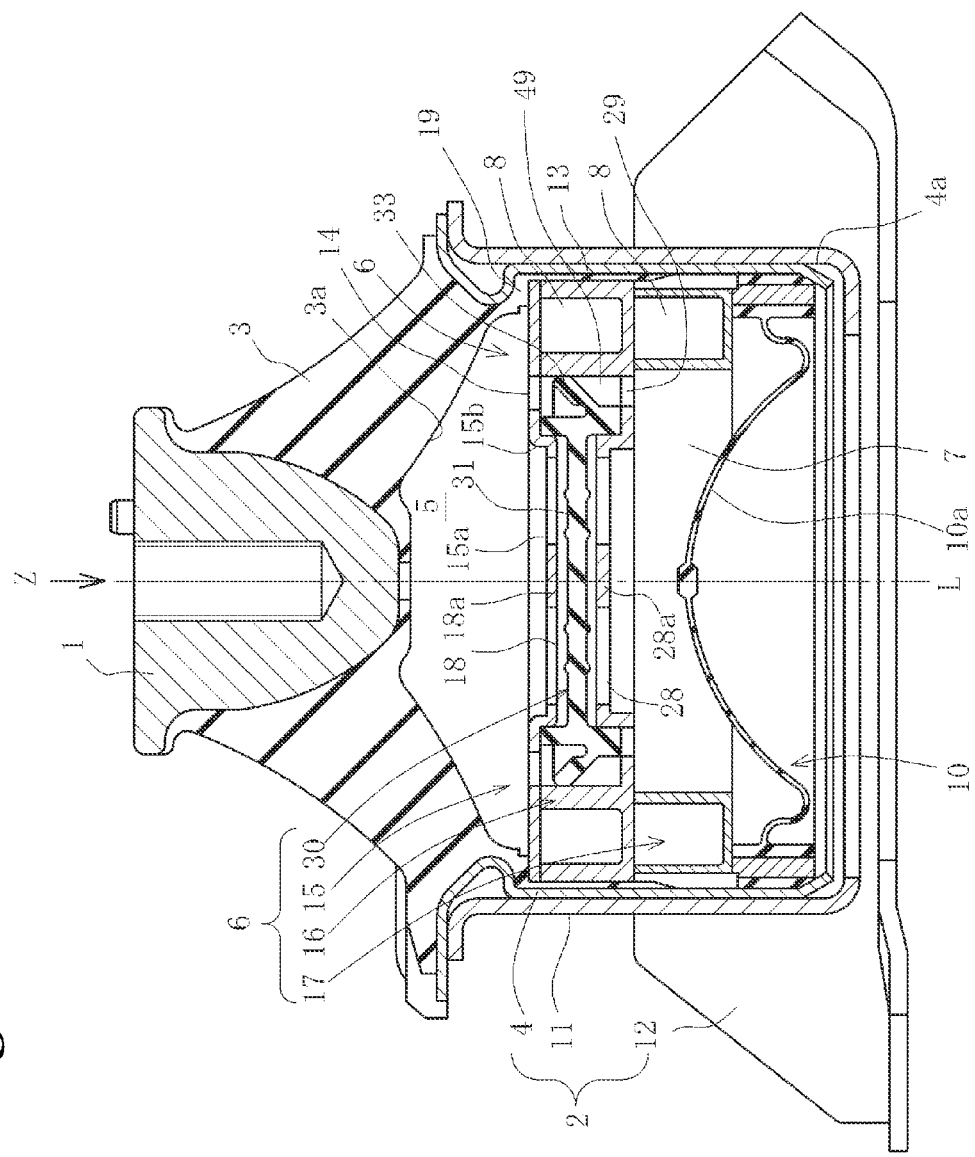
FIG. 1 is a vertical cross sectional view of an engine mount taken along a center axis thereof according to a first embodiment of the present invention.
Figure 2:
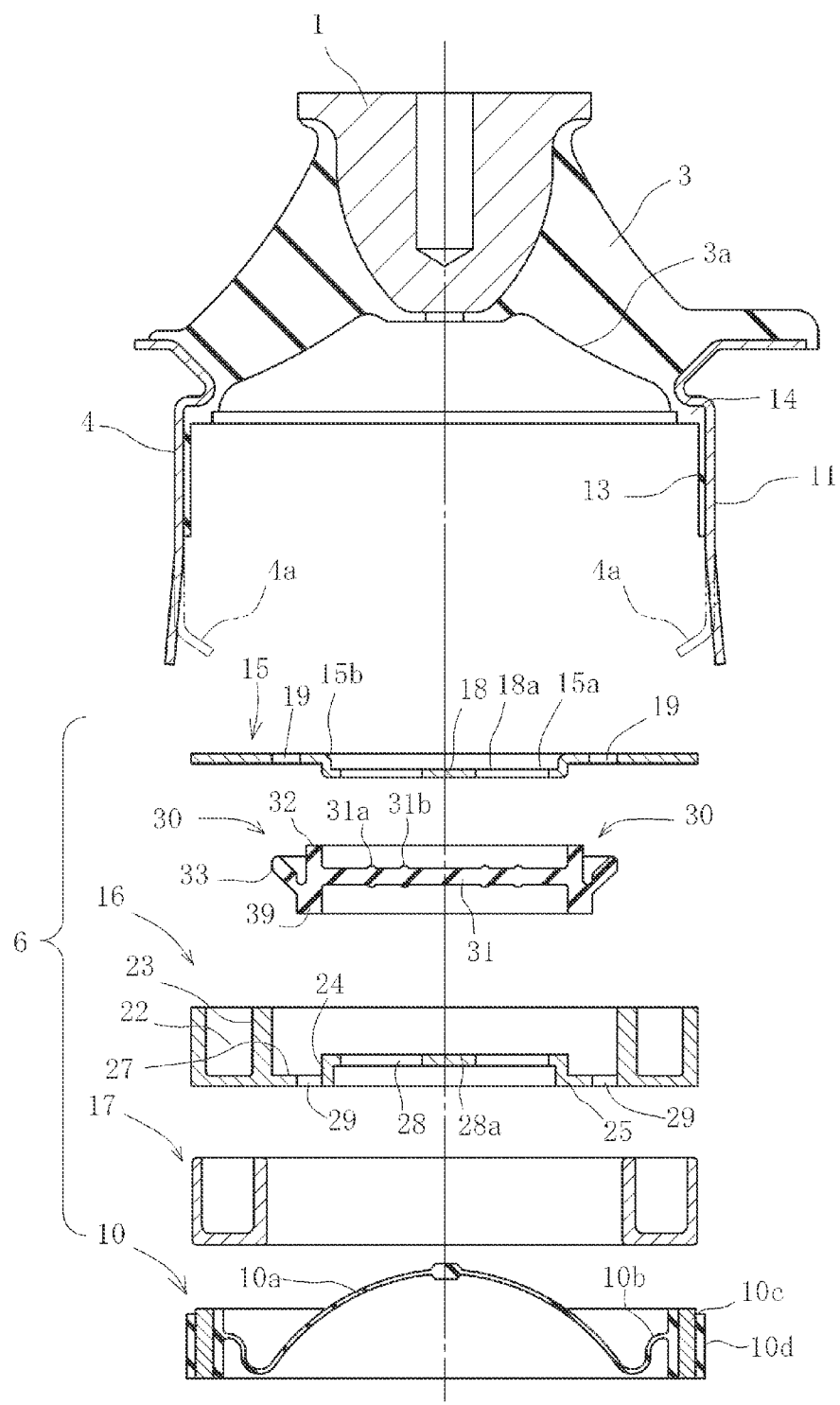
FIG. 2 is an exploded view of each component element of the above engine mount.

Hereinafter, an embodiment of a liquid sealed vibration isolating device formed as an engine mount for a motor vehicle will be described with reference to the accompanying drawings. FIGS. 1 through 10 are concerned with a first embodiment of the present invention, wherein FIG. 1 is a vertical cross sectional view of the engine mount and FIG. 2 is an exploded view of each component element of the engine mount. FIG. 1 is also a cross sectional view taken along the input direction Z of a main vibration.

In the following description, each orientation such as upper, lower, left, right and the like shall be determined based on an illustrated condition in FIG. 1. In addition, a plan view is a view when viewed from above in the direction of Z along a mount axis L. With respect to an elastic partition member and a movable diaphragm section, a radial direction is a direction pointing from a center which each of mount axes L intersects, to a direction orthogonal to each of the mount axes L, and a circumferential direction is a circumferential direction of the mount axes L.

Referring now to these figures, this engine mount comprises a first mounting member 1 mounted on the side of an engine (not shown in the drawing) as a vibration source, a second mounting member 2 mounted on a vehicle body (not shown) as a vibration receiving side, and an insulator 3 configured to provide an elastic connection between the first and second mounting members 1, 2.

The insulator 3 is formed of a publicly known vibration isolating elastic member such as rubber or the like and is an elastic body which is a main vibration isolating means against vibration. The vibration inputted to the first mounting member 1 in the direction of Z along a mount axis L as a center axis of this engine mount is absorbed firstly by the elastic deformation of the insulator 3.

The insulator 3 is formed in the shape of substantially a circular truncated cone and provided with an upwardly convexed dome-shaped portion 3a on the inside thereof. An upper part of an outer cylindrical metal fitting 4 is integrally formed with an outer circumferential portion of the insulator 3. The outer cylindrical metal fitting 4 forms a part of the second mounting member 2. An upper opening of the outer cylindrical metal fitting 4 is closed by the insulator 3 while a lower opening thereof is closed by a diaphragm 10, so as to form a hermetically closed space in the inside. This hermetically closed space is filled with an incompressible hydraulic liquid to thereby form a liquid chamber which uses the insulator 3 and the diaphragm 10 as a part of a wall thereof.

This liquid chamber is partitioned by a partition member 6 into a primary liquid chamber 5 and a secondary liquid chamber 7 having long valve length. The primary liquid chamber 5 and the secondary liquid chamber 7 are connected by an orifice passage 8 which is formed in a circular arc shape when viewed from the Z direction and located in an outer circumferential part of the partition member 6 (communicating ports at each end of the orifice passage 8 which communicate with each of the liquid chambers are not shown in the drawing). The orifice passage 8 is configured as a damping orifice which is able to obtain high damping by resonating with the vibration of low frequency of about 10~11 Hz which consists of a shake vibration and the like.

The second mounting member 2 has a circular holder 11 into which the outer cylindrical metal fitting 4 is fitted, so as to be integrally combined therewith. This second mounting member 2 is mounted on the vehicle body side through a bracket 12 which is attached to an outer periphery of the holder 11 by welding and the like if necessary.

An extending section 13 of the insulator 3 is integrally joined with an inside of the outer cylindrical metal fitting 4. The extending section 13 extends downwardly to approximately the same level as the position of the partition member 6 to thereby cover integrally an internal surface of the outer cylindrical metal fitting 4. A portion located in an upper part of the extending section 13 and facing the primary liquid chamber 5 forms a step portion 14 by which an outer circumferential end of the partition member 6 is fixed in its upward position.

As clearly shown in FIG. 2, the partition member 6 has an upper plate 15 and a lower holder 16 divided in the upward and downward direction, and an elastic partition member 30 held between the upper plate 15 and the lower holder 16 from upper and lower sides.

Although the upper plate 15, the lower holder 16 and the elastic partition member 30 are formed in a concentric circle shape in a plan view respectively, the elastic partition member 30 is smaller in diameter than the upper plate 15 and the lower holder 16 and is arranged on the inside in the radial direction of the upper plate 15 and the lower holder 16. The orifice passage 8 is arranged on the outside in the radial direction of the elastic partition member 30 and located between the upper plate 15 and the lower holder 16.

By the way, the elastic partition member 30 may be formed in non-circular shape in a plan view, as will be referred to later.

A reference character 17 designates a lower stage holder 17 which is placed under the lower holder 16 so as to be integrated into one unit in the case where it is required to lengthen the orifice passage 8. The lower stage holder 17 is a member for lengthening the orifice passage 8 by forming the latter in a spiral shape extending between two upper and lower stages consisting of the lower holder 16 and the lower stage holder 17. The lower stage holder 17 is used depending on the situation and is omissible.

The relief valve 33 is integrally provided in an outer peripheral portion of the elastic partition member 30 and configured to open and close a leak passage 49 which communicates between a leak hole 19 on the side of the primary liquid chamber 5 and a leak hole 29 on the side of the secondary liquid chamber 7. When the leak passage 49 is opened, the relief valve 30 leaks the hydraulic liquid from the secondary liquid chamber 7 side to the primary liquid chamber 5 side.

Further, the elastic partition member 30 is provided with a movable diaphragm section 31 at the center thereof. The movable diaphragm section 31 faces into the primary liquid chamber 5 through an upper center opening 18 of the upper plate 15 and into the secondary liquid chamber 7 through a lower center opening 28 of the lower holder 16, so that the movable diaphragm section 31 is elastically deformed by hydraulic pressure fluctuation of the primary liquid chamber 5 to thereby absorb internal pressure fluctuation.

The diaphragm 10 has a thin main body section 10a and a thick wall section 10b integrally formed in an outer circumferential portion of the main body section 10a. A fixing ring 10c is inserted into the thick wall section 10b and integrally combined therewith. A seal section 10d which is a part of the thick wall section 10b extends radially outwardly from an outer circumferential surface of the fixing ring 10c. The fixing ring 10c is press fitted through the seal section 10d into an inside of the outer cylindrical metal fitting 4. Each of upper and lower end surfaces of the fixing ring 10c is exposed, and the upper end surface is in contact with an outer bottom circumference of the lower holder 16. The lower end surface of the fixing ring 10c is caulked and fixed by a lower end portion of the outer cylindrical metal fitting 4 (see FIG. 1).

When assembling this engine mount, firstly as shown in FIG. 2, the first mounting member 1, the insulator 3 and the outer cylindrical metal fitting 4 are integrated into a sub-assembled unit, and this sub-assembled unit is turned so as to turn the opening portion of the outer cylindrical metal fitting 4 upwardly.

Next, the sub-assembled partition member 6 is also turned upside down from a condition of FIG. 1 and fitted into the inside of the outer cylindrical metal fitting 4 in such a way as to be fixed in position by the step portion 14.

After that, the fixing ring 10c of the diaphragm 10 is press fitted to and abuts on the lower surface of the partition member 6 in the condition shown in the drawing. Then, the outer cylindrical metal fitting 4 is drawn in such a manner that a distal end of the outer cylindrical metal fitting 4 is bent inward to form a bent portion 4a (see FIG. 1). When the bent portion 4a brings the upper end surface of the fixing ring 10c in the condition shown in the drawing into press contact with the lower surface of the partition member 6, all of the component parts are assembled together into a unit.

Next, the partition member 6 will be described in detail.

Figure 3:
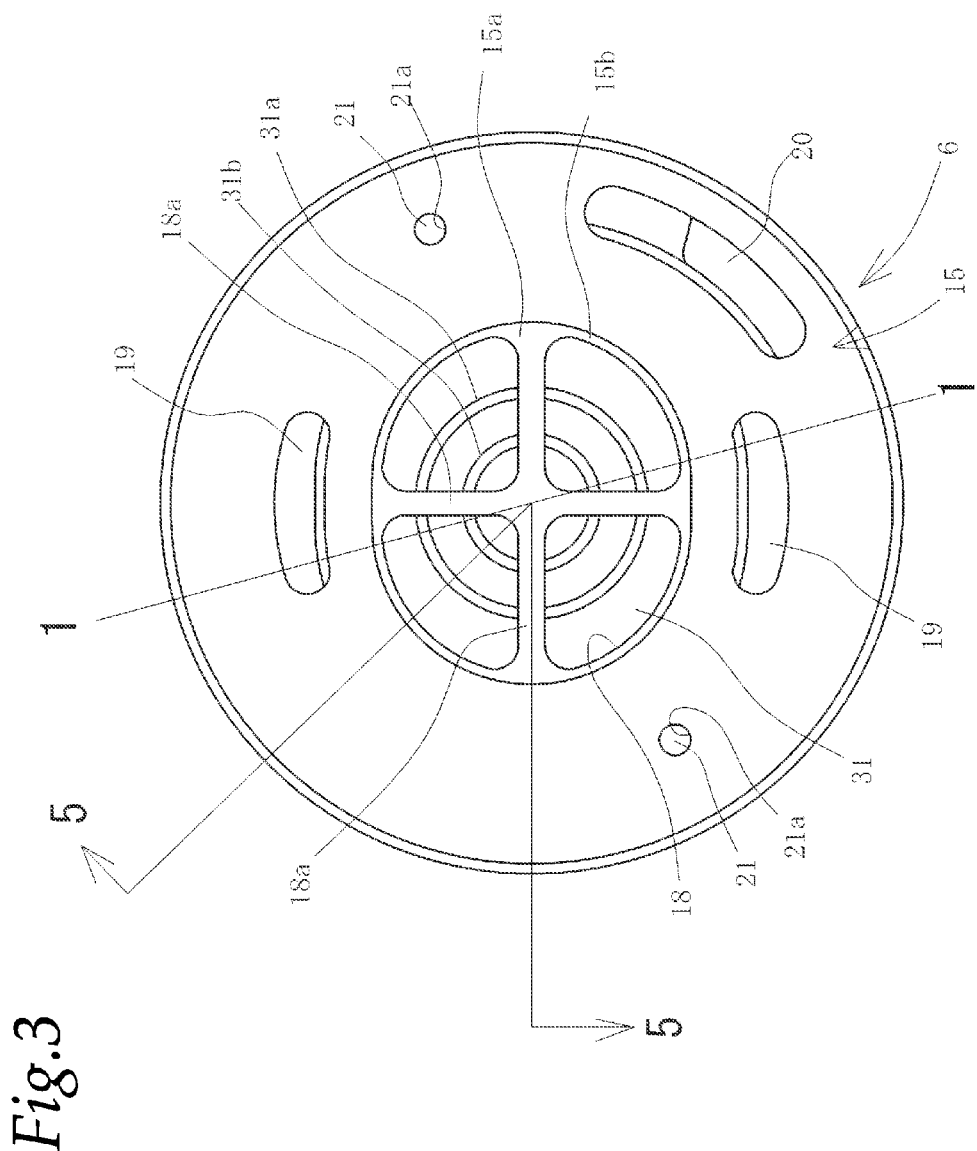
FIG. 3 is a plan view of a partition member in an assembled condition.
Figure 4:
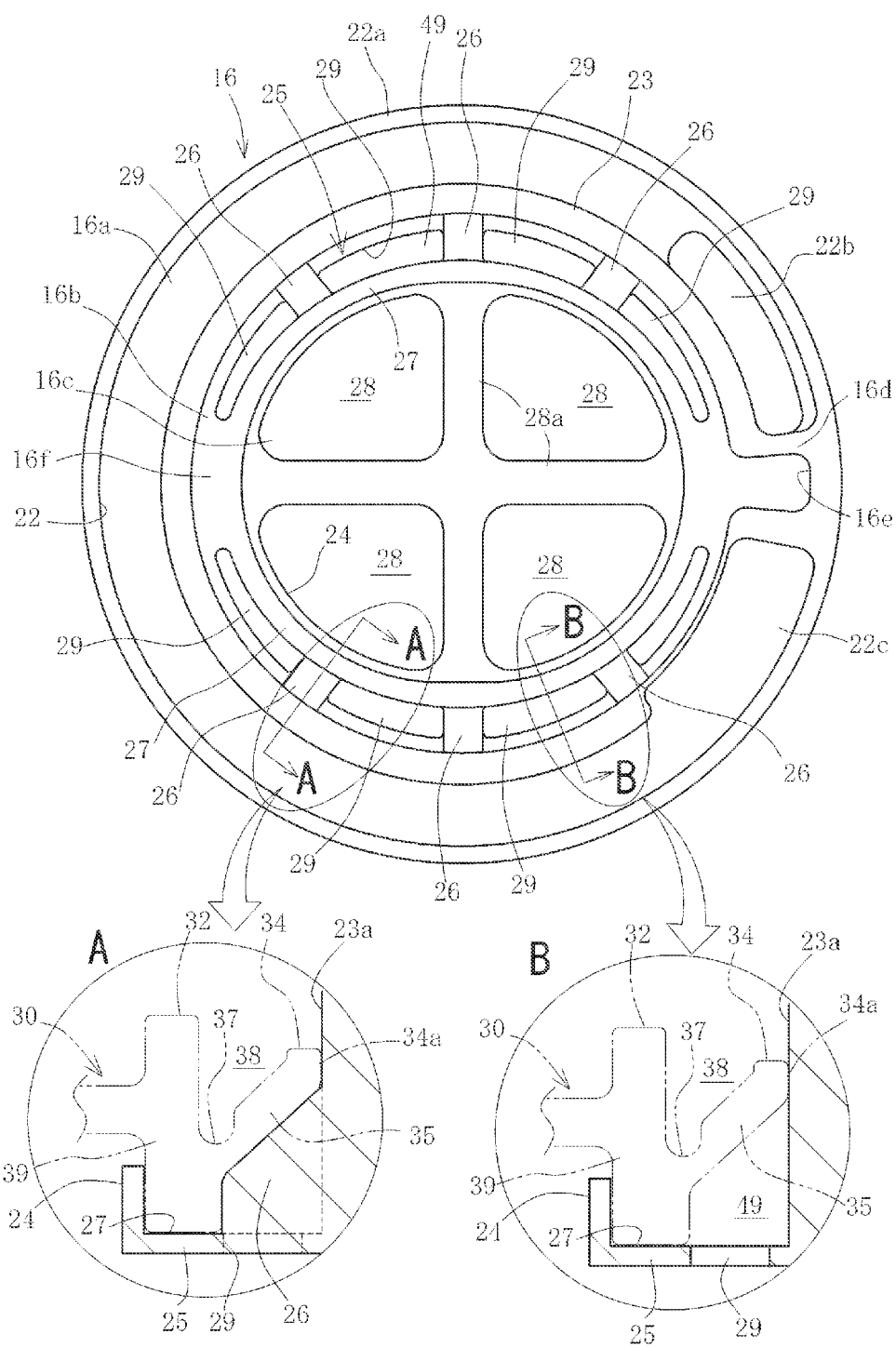
FIG. 4 is a plan view of a lower holder.
Figure 5:
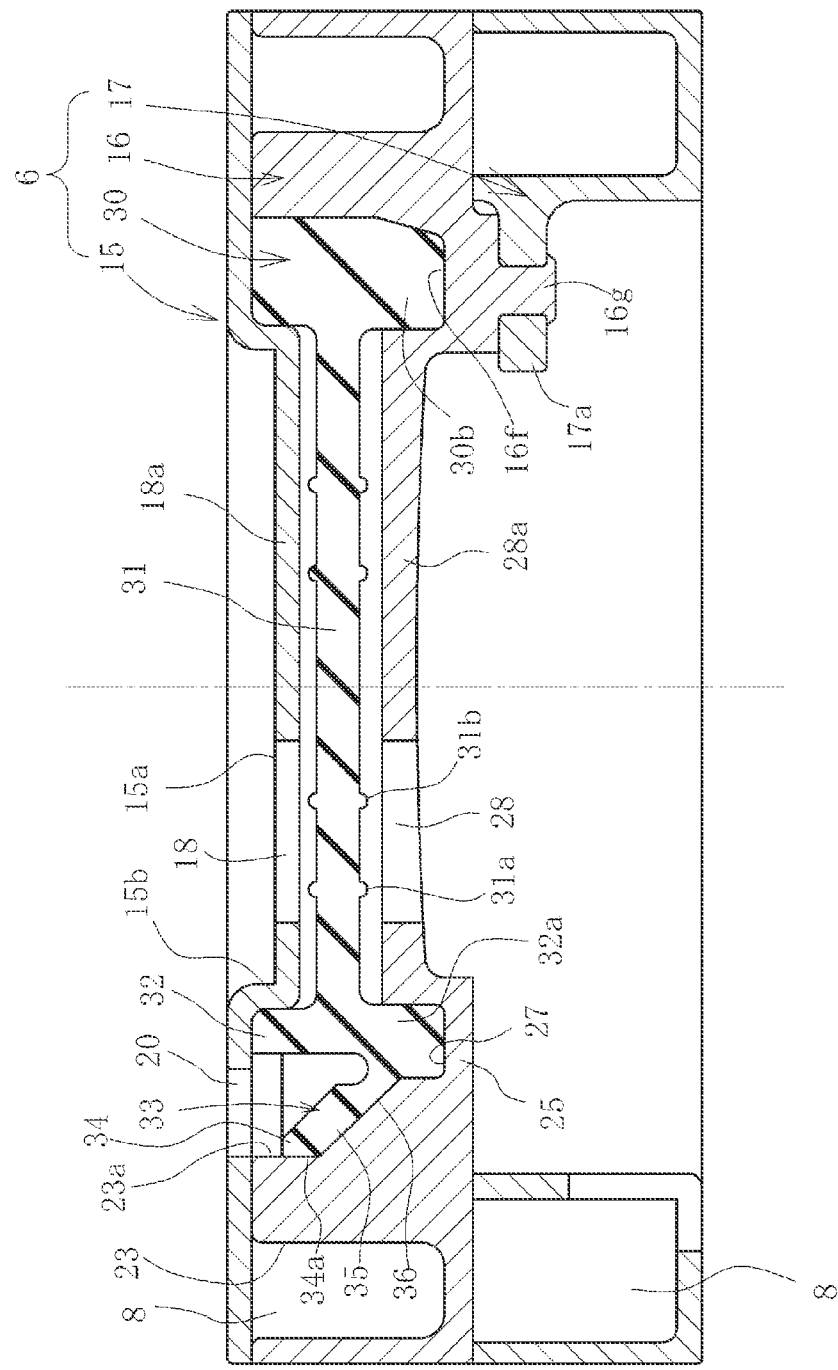
FIG. 5 is a cross sectional view taken along line 5-5 of FIG. 3.

FIG. 3 is a plan view of the partition member 6. FIG. 4 is a plan view of the lower holder 16. FIG. 5 is a cross sectional view taken along line 5-5 of FIG. 3. Herein, the cross section of the partition member 6 in FIG. 1 corresponds to a cross section taken along line 1-1 of FIG. 3. As shown in these drawings, the partition member 6 is a hollow frame shaped body having a circular shape in a plan view. The upper plate 15 and the lower holder 16 each have rigidity and are made of proper materials such as light metal, hard resin and the like.

The upper plate 15 whose plan view is shown in FIG. 3 is in the shape of circular disc and a center of the upper plate 15 is lowered a step so as to form a central step section 15a. In the central step section 15a there is formed the upper central opening 18 which communicates with the primary liquid chamber 5. A reference character 18a designates a cross-shaped deformation restriction frame which consists of a remaining portion when having punched out the upper central opening 18. The pair of leak holes 19 in the form of a circular arc shaped long hole are located on the outer circumferential side of the central step section 15a and arranged face to face with each other on the same circumference.

A reference character 20 designates a primary liquid chamber side opening of the orifice passage 8. Positioning projections 21 project from the lower holder 16 and are engaged into small bores 21*a* formed in the upper plate 21*a*, so that the upper plate 15 and the lower holder 16 are fixed in position and combined together.

FIG. 4 is a plan view of the lower holder 16. The lower holder 16 includes an outer circumferential annular wall 22*a* which forms a circumferential wall in an outermost circumferential region, an annular partition wall 23 on the inside of the outer circumferential annular wall 22*a*, and an inner circumferential annular wall 24 on the inside of the annular partition wall 23. The outer circumferential annular wall 22*a*, the annular partition wall 23 and the inner circumferential annular wall 24 are arranged concentrically.

By these walls, within the lower holder 16 an orifice section 16*a*, a valve section 16*b* and a central opening section 16*c* are formed and partitioned in the direction from the outer circumferential side to the inner circumferential side.

The orifice section 16*a* is an annular space surrounded by the outer circumferential annular wall 22*a*, the annular partition wall 23 and the lower holder 16. A circular arc shaped groove 22 is formed in this annular space. The circular arc shaped groove does not extend along the full circumference, and the outer circumferential annular wall 22*a* and the annular partition wall 23 are connected by a connecting section 16*d* provided at a single location in the circumferential direction. Both ends in the longitudinal direction of the circular arc shaped groove 22 are located at the connecting section 16*d*. One of the ends in the longitudinal direction of the circular arc shaped groove 22 forms a communicating port 22*b* with the secondary liquid chamber side, while the end 22*c* on the other side is located directly under the primary liquid chamber side opening 20. A positioning groove 16*e* is provided in the connecting section 16*d*.

The valve section 16*b* is an annular space surrounded by the annular partition wall 23 of circular shape, the inner circumferential annular wall of elliptical shape and a bottom portion 25 of the lower holder 16. An outer circumferential part of the elastic partition member 30 located on the outer side of a fixing section 32 and containing the relief valve 33 is accommodated in this annular space.

A space between the annular partition wall 23 and the inner circumferential annular wall 24 varies in the circumferential direction in such a manner that it is narrowest in the left and right direction of the drawing and widest in the upper and lower direction thereof.

This internal space is partitioned in the upward and downward direction so as to form the pair of leak passages 49 (see FIG. 1).

The upper and lower leak passages 49 are divided into sections when the elastic partition member 30 is fitted in the inside of the valve section 16*b*. Namely, the valve section 16*b* is continuously connected to the positioning groove 16*e* in a right side part of the drawing, and when the outer circumferential portion located on the outside of the fixing section 32 is fitted in the valve section 16*b*, a positioning projection 30*a* (see FIGS. 6 and 7) formed in the elastic partition member 30 is engaged with the positioning groove 16*e*.

Further, into an opposite side portion 16*f* of the valve section 16*b* located on the opposite side of the positioning groove 16*e* there is engaged a thick-wall end 30*b* (see FIGS. 6 and 7) of the outer circumferential portion of the elastic partition member 30 formed in a part on the opposite side of the positioning projection 30*a*, so that the inside of the valve section 16*b* is divided hermetically into sections in the upward and downward direction of the drawing. Therefore, the leak passages 49 are divided into two sections in the upward and downward direction of the drawing and formed long in such a way as to substantially halve the circumferential length of the valve section 16*b*.

Each of the leak passages 49 is of crescent shape in a plan view. The crescent shape is formed by the annular partition wall 23 of circular shape on the outer circumferential side and the inner circumferential annular wall 24 of elliptical shape on the inner circumferential side. The leak hole 19 of the upper plate 15 is disposed above and overlaps with a part corresponding to a middle portion P in the longitudinal direction of each of the leak passages 49, so that the leak passages 49 are in communication through the leak holes 19 with the primary liquid chamber 5. Although an opening area of the leak hole 19 is a portion of the leak passage 49, it is configured to ensure a sufficient leak amount for preventing the cavitation. In addition, the leak hole 19 is arranged above a part of the relief valve 33 which is capable of being most easily opened, as will be referred to later.

Each of the leak passages 49 is in communication with the secondary liquid chamber 7 through a plurality of leak holes 29 formed in the bottom portion 25 thereof. A neighboring part of the bottom portion 25 is formed with an annular groove 27 which is an annular recess for accommodating a fixing base portion 39 (FIG. 4) of the elastic partition member 30, and the leak passages 49 are formed in and pass through the neighboring part of the bottom portion 25. The leak passages 49 arranged in pairs at opposite sides in the upward and downward direction of the drawing. Although, when inner circumferential sides of the neighboring leak holes 29 are connected, a generally elliptical shape is formed, an intermediate portion in the circumferential direction thereof is divided in sections by a plurality of stoppers 26.

An enlarged part A of FIG. 4 illustrates a cross section in the radial direction of the stopper 26 part. The stopper 26, also as shown in FIG. 5, has an upper end surface which is formed in an inclined surface shape for supporting a lower surface of the relief valve 33 (an inclined surface wall 35) at the time of being closed and which projects more upwardly than a common surface (a surface of a bottom part of the valve section 16*b* excluding the stopper 26, in which the leak passage 49 is open) of the bottom portion 25.

An enlarged part B of FIG. 4 illustrates a cross section in the radial direction of the leak hole 29 part. The leak hole 29 communicates with the leak passage 49 of crescent shape in a plan view. An inner circumferential surface of the annular partition wall 23 facing the leak passage 49 is formed as a seat surface 23*a*. A seal surface 34*a* of a distal end portion 34 of the relief valve 33 makes liquid sealing contact with the seal surface 23*a* when the relief valve 33 is closed.

The central opening section 16*c* is an inside part of the inner circumferential annular wall 24 in which the movable diaphragm section 31 is accommodated. The lower central opening 28 is formed in the bottom portion 25 of this inside part while leaving a deformation restriction frame 28*a* of substantially cross shape and passes through the bottom portion 25. An outer end portion in the radial direction of the deformation restriction frame 28*a* is continuously connected to and integrally combined with the inner circumferential annular wall 24 which surrounds the lower central opening 28.

As shown in FIG. 5, the lower stage holder 17, as needed, is placed under the lower holder 16 and combined together in such a manner that a connecting projection 16*g* extending downwardly from the bottom portion 25 of the lower holder 16 is engaged with a mounting hole of a mounting arm section 17a projecting from an inner circumferential wall of the lower stage holder 17 and then a projecting tip out of the mounting hole, of the connecting projection 16g is crushed and integrally combined with the mounting arm section 17a by a proper connecting means such as caulking or the like.

An upwardly open circular arc shaped groove 17b is provided in the lower stage holder 17 and communicates through the communicating port 22b with the circular arc shaped groove 22 in a position not shown in the drawing. Moreover, it communicates with the secondary liquid chamber 7 through a communicating port (not shown in this drawing) formed in a part of the inner circumferential wall. Accordingly, the orifice passage 8 is able to be lengthened by two-stage formation of the circular arc shaped grooves 22 and 17.

Figure 6:
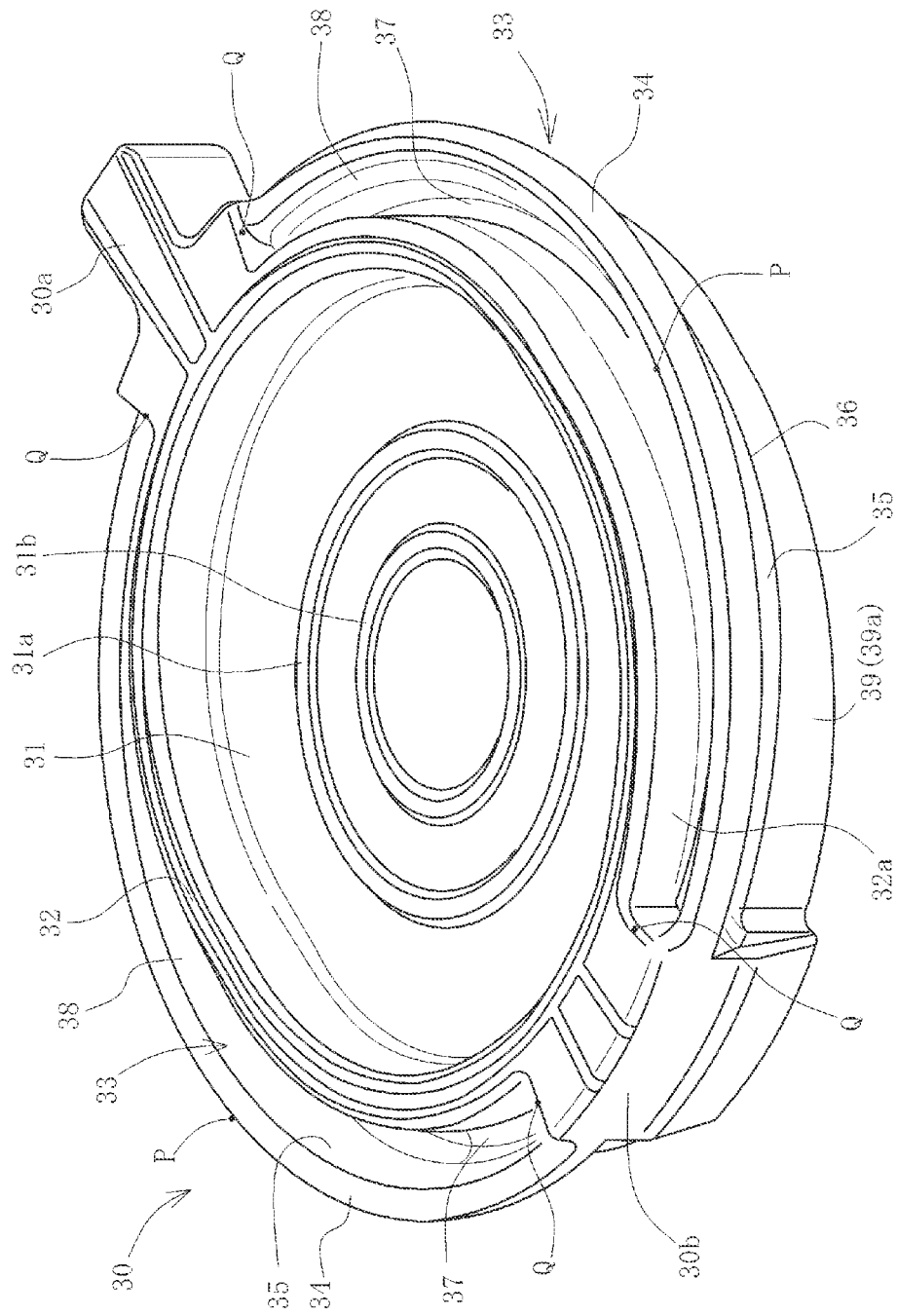
FIG. 6 is a perspective view of an elastic partition member.
Figure 7:
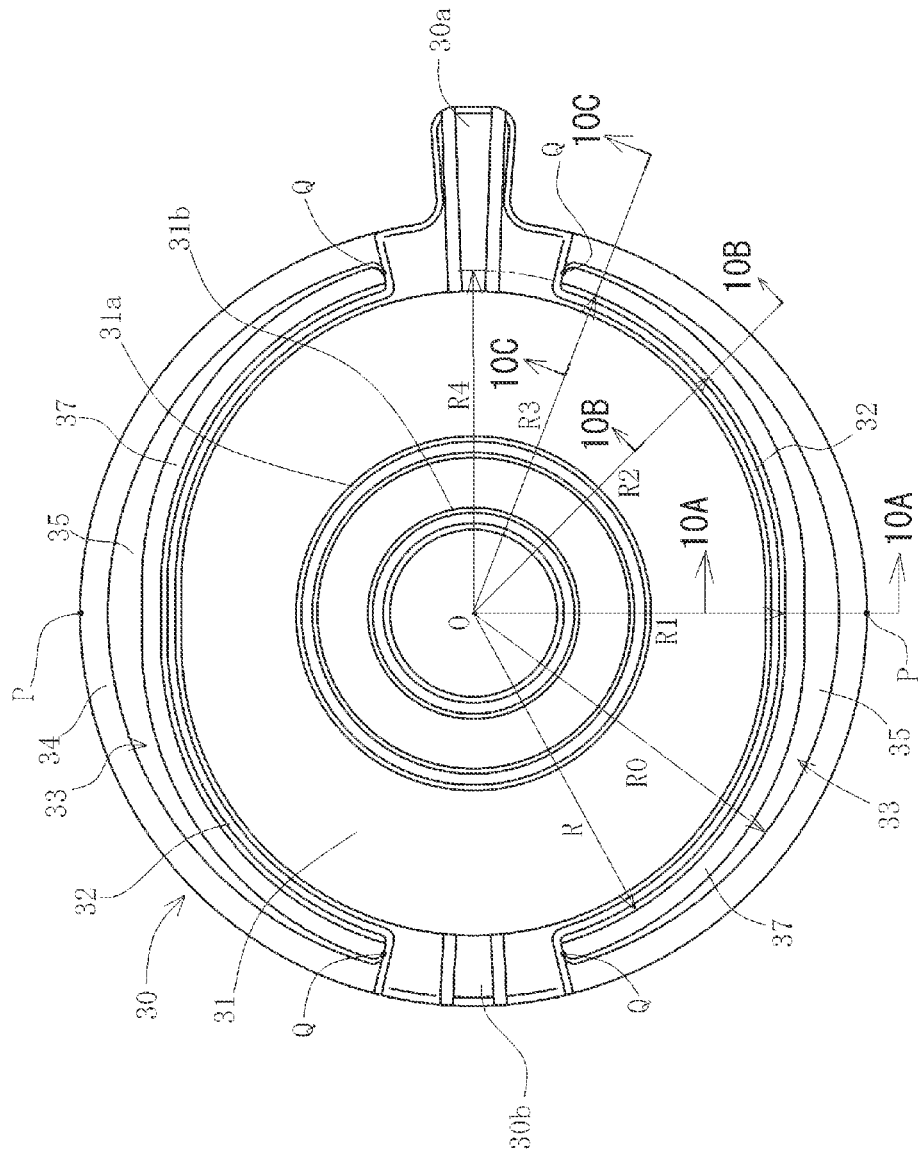
FIG. 7 is a plan view of the elastic partition member.
Figure 8:
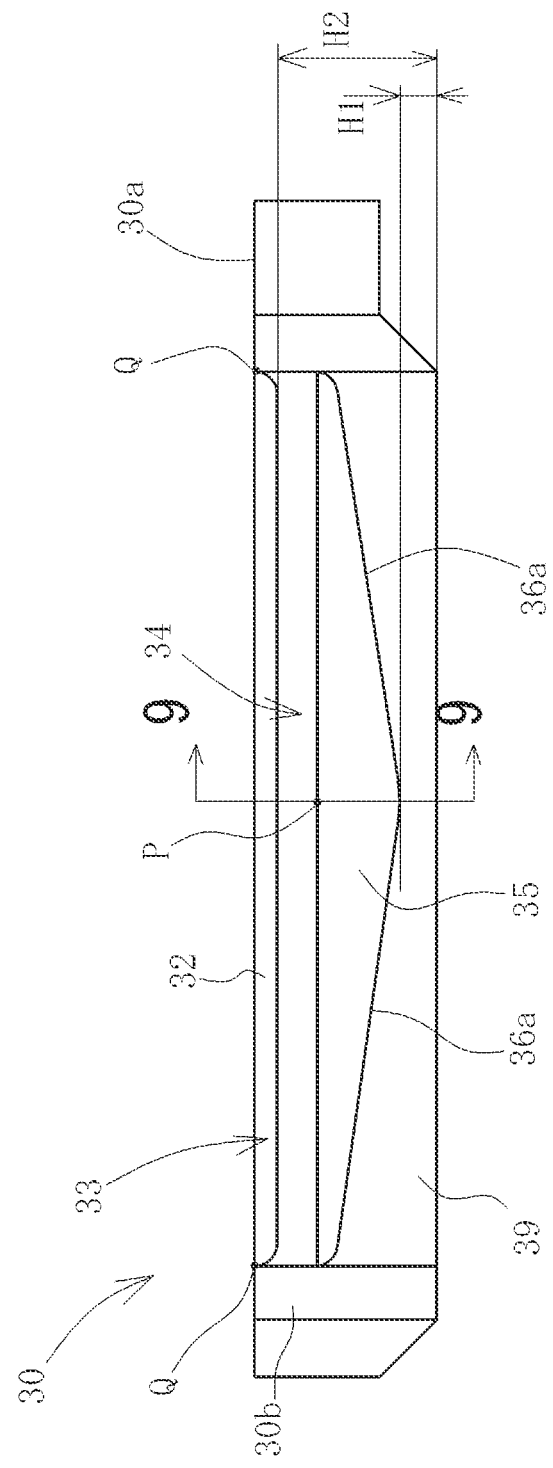
FIG. 8 is a front view of the elastic partition member.
Figure 9:
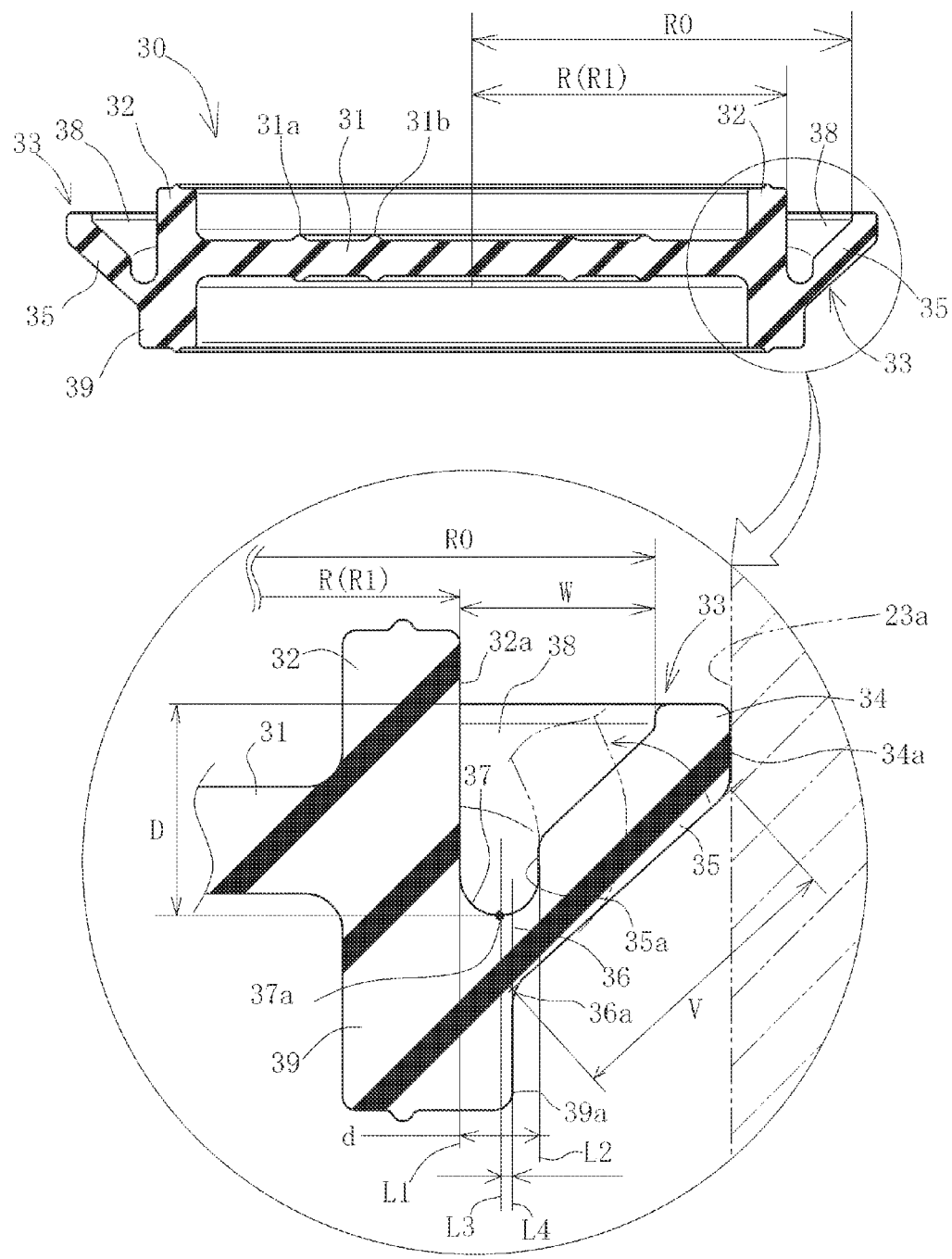
FIG. 9 is a cross sectional view taken along line 9-9 of FIG. 8.

Next, the details of the elastic partition member 30 will be described. FIG. 6 is a perspective view of the elastic partition member 30. FIG. 7 is a plan view thereof. FIG. 8 is a front view thereof, and FIG. 9 is a cross sectional view taken along line 9-9 of FIG. 7.

The elastic partition member 30 is made of a proper elastic member such as rubber or the like and integrally provided with the movable diaphragm section 31 as a central thin diaphragm part, the fixing section 32, and the relief valve 33 formed on the outer circumferential side of the fixing section 32.

The movable diaphragm section 31 faces the upper central opening 18 and the lower central opening 28 and is elastically deformed by the hydraulic liquid flowing in and out from these openings so as to absorb the internal pressure fluctuation of the primary liquid chamber 5 by the elastic deformation. The excessive deformation of the movable diaphragm section 31 is restricted by the cross shaped deformation restriction frames 18a and 28a.

A plurality of projecting rims 31a and 31b are integrally formed on the movable diaphragm section 31 in concentric circle form and configured to make initial contact with the upper plate 15 and the lower holder 16 at a small contact area when the movable diaphragm section 31 is elastically deformed.

The fixing section 32 is a thick rigid annular wall formed on the outer circumferential side of the movable diaphragm section 31. An upper part of the fixing section 32 is fixed in position by a step portion 15b (see FIG. 5) in the outer circumferential part of the central step section 15a of the upper plate 15. The fixing base portion 39 is a restrained portion which is positioned in engagement with the annular groove 27 and held between the upper plate 15 and the lower holder 16 from upper and lower sides so as to be fixed in position. The fixing base portion 39 is configured to serve as an annular supporting portion of the movable diaphragm section 31.

In a plan view, the movable diaphragm section 31 has a non-circular form in an elliptical shape. However, as will be referred to later, the movable diaphragm section 31 may be formed in a non-circular shape other than an elliptical shape and also may be formed in a circular shape.

Exactly, although the movable diaphragm section 31 of this embodiment is formed in an oblong shape similar to the shape of a track for athletic sports, this form also is included in the elliptical shape. In addition, a part of such elliptical shape is to be referred to as "elliptical arc".

The fixing section 32 forms an outer circumference of the movable diaphragm section 31. Therefore, it is also of elliptical shape. A distance R (an outer radius of the fixing section 32) from a center O of the movable diaphragm section 31 to the outer circumferential portion of the fixing section 32 varies in the circumferential direction. In relation to the relief valve 33, the distance at a neighboring part of a portion corresponding to the middle portion P in the longitudinal direction of the relief valve 33 is shortest R1, and the distance at a neighboring part of a portion corresponding to the end portion Q in the longitudinal direction is longest R3. R2 is a radius at an intermediate portion between P and Q. With respect to the elliptical configuration of the movable diaphragm section 31, R1 is referred to as a short radius, and a distance R4 between the center O and an extending portion of the outer circumferential portion of the fixing section 32 at a positioning projection 30a or at the thick-wall end 30b is referred to as a long radius. The long radius R4 is longer than R3.

In addition, the middle portion P in the longitudinal direction of the relief valve 33 corresponds to a part located radially outwardly of the fixing section 32 on the short radius R1 of the elliptical movable diaphragm section 31. A position corresponding to the end portion Q in the longitudinal direction is a position located radially outwardly of the fixing section 32 in a part neighboring on the long radius R4 of the movable diaphragm section 31. With this configuration, a relatively enlarged space is provided in a part of the outer circumferential portion of the elastic partition member 30 located radially outwardly in the vicinity of the short radius R1 of the movable diaphragm section 31. By utilizing this space, a longest valve length portion of the relief valve 33, namely a largest opening width portion thereof, is able to be arranged effectively.

The relief valve 33 divided into two sections in the upward and downward direction of the drawing by the positioning projection 30a and the thick wall end 30b which are formed left and right in FIG. 7. The relief valve 33 is provided with the distal end portion 34, the inclined surface wall 35 and a circumferential groove 37 in order from an outward position to an inward position in the radial direction.

This relief valve 33 has about a half length of the full circumference of the outer peripheral portion of the elastic partition member 30 and is arranged in a crescent shape in a plan view in pairs in symmetrical fashion with respect to a center of the elastic partition member 30.

The crescent shape of this relief valve 33 is formed between the distal end portion 34 of circular arc shape and the fixing section 32 of elliptical shape. Namely, in the case where the inner and outer circumferences are formed by a combination of curved lines which have different curvatures, this crescent shape is formed by combining an inside line of small curvature with an outside line of large curvature.

The distal end portion 34 is a thick outer circumferential part of circular arc shape to be brought into liquid sealing contact with the outer circumferential wall surface of the leak passage 49 when the relief valve 33 is closed. A radius R0 of the distal end portion 34 is constant in full circumference (R0 shown in the drawing is an inner radius). Each of ends in the circumferential direction of the distal end portion 34 is continuously connected to the positioning projection 30a and the thick wall end 30b. This connected portion corresponds to the end portion Q in the longitudinal direction of the relief valve 33.

The inclined surface wall 35 is a main body part of the relief valve 33 to be elastically deformed in such a way as to be bent when the relief valve 33 is opened and closed. Each of ends in the longitudinal direction thereof is continuously connected to the positioning projection 30a and the thick wall end 30b. The positioning projection 30a and the thick wall end 30b are thick and have the highest rigidity, with respect to the elastic partition member 30. They are configured to support the inclined surface wall 35 in the longitudinal direction of the relief valve 33.

The circumferential groove 37 is a recessed groove of elliptical arc shape which extends in a similar form along the outer circumference of the fixing section 32 in the circumferential direction. The circumferential groove 37 is formed in a base part of the inclined surface wall 35 connected to the outer circumferential portion of the fixing section 32. Therefore, an outer circumferential portion of the inclined surface wall 35 is formed in a circular arc shape by the distal end portion 34 while an inner circumferential portion thereof is formed in a circular arc shape by the circumferential groove 37. The width of the inclined surface wall 35 varies continuously in the circumferential direction in such a condition that the ends Q in the longitudinal direction in the vicinity of the positioning projection 30a and the thick wall end 30b are narrowest and the middle portions P (upper and lower portions of FIG. 7) in the longitudinal direction are widest. In addition, the leak holes 19 (see FIG. 3) of the upper plate 15 are arranged in such a way as to overlap with the middle portions P in the longitudinal direction.

As shown in FIG. 8, a lower surface base portion 36a (details will be referred to later) of the relief valve 33 varies in height continuously in the circumferential direction in such a condition that the middle portion P in the longitudinal direction is lowest H1 and the ends Q in the longitudinal direction are highest H2. Therefore, a base section 36 is inclined obliquely upwardly in the direction facing from the middle portion P in the longitudinal direction to both ends Q in the longitudinal direction. With this configuration, the valve length of the relief valve 33 varies in the circumferential direction, as will be referred to later.

Further, the position of the lower surface base portion 36a corresponds to the position of a bottom portion of the circumferential groove 37, and the position of the bottom portion of the circumferential groove 37 varies also in the longitudinal direction so as to form a bottom line E extending in parallel with the lower surface base portion 36a. However, the depth of the circumferential groove 37 is constant in the longitudinal direction.

As shown in FIG. 9 and an enlarged part thereof, the relief valve 33 is integrally formed with the inclined surface wall 35 which extends radially outwardly in a branching form from the outer circumferential surface of the fixing section 32 in the form of annular wall. The inclined surface wall 35 extends radially outwardly in the obliquely upward direction while making an acute angle with the fixing section 32. Both ends in the circumferential direction of the inclined surface wall 35 are continuously connected to the positioning projection 30a and the thick wall end 30b.

An upwardly (in the direction of the primary liquid chamber 5) open recessed portion 38 is formed between the fixing section 32 and the inclined surface wall 35. Each end in the circumferential direction of the recessed portion 38 is closed by the positioning projection 30a and the thick wall end 30b (see FIGS. 6 and 7).

An opening width W as a width in the radial direction of the recessed portion 38 is a distance between an outer circumferential surface 32a of the fixing section 32 and an inner circumferential part of the distal end portion 34 and varies in the longitudinal direction.

Further, a depth D of the recessed portion 38 (a length between an upper end of the relief valve 33 and a bottom center 37a of the circumferential groove 37 corresponding to the lowest portion of the recessed portion 38) varies also in the longitudinal direction.

The seal surface 34a of the distal end portion 34 is formed in face to face relationship with and substantially in parallel with the seat surface 23a of the annular partition wall 23 and makes liquid sealing contact with the seal surface 23a due to a relatively wide sealing area whereby to make it possible to prevent the leak of the hydraulic liquid flowing from the primary liquid chamber 5 to the secondary liquid chamber 7.

The distal end portion 34 is a free end in the meaning that only the opening in the valve closing direction is restricted and the movement in the valve closing direction is not restricted. The distal end portion 34 serves as a thick wall part for giving a certain amount of rigidity to the distal end of the relief valve 33 and is able to be deformed evenly at the full length thereof in the circumferential direction.

A valve length V which is a length of a lower surface of the inclined surface wall 35 in a cross section shown in the drawing varies in the circumferential direction. The valve length V is a distance between an intersection point of the lower surface of the inclined surface wall 35 with a circumferential surface 39a of the fixing base portion 39 and an intersection point of the lower surface of the inclined surface wall 35 with the seal surface 34a of the distal end portion 34. In addition, the intersection point of the lower surface of the inclined surface wall 35 with the outer circumferential surface 39a of the fixing base portion 39 is referred particularly to as a lower surface base portion 36a.

This valve length V has an influence on an opening and closing movement of the relief valve 33. Further, what the valve length V varies in the circumferential direction has an important influence upon a valve opening characteristic, as will be referred to later in detail.

Further, since the lower surface of the inclined surface wall 35 shown in the drawing is of linear shape in a cross section in the radial direction, the intersection point of an extension of the lower surface with the outer circumferential surface 39a forms the lower surface base portion 36a, simply. However, in the case where the lower surface of the inclined surface wall 35 has a curved line shape and intersects with the outer circumferential wall 39a at a round part, the lower surface base portion 36a is an intersection point of the outer circumferential surface 39a of the lower surface of the inclined surface wall 35 excluding the round part, with the outer circumferential surface 39a in the case of extending the curved line which is located in the closest position.

The base section 36 of the relief valve 33 connected to the fixing section 32 forms a thin wall part for bending, by the circumferential groove 37 formed on the upper side located on the recessed portion 38 side, so as to make easy the bending operation of the relief valve 33 at the time of opening and closing the valve.

The circumferential groove 37 is a groove of circular arc shape formed by engraving an upper part of the base section 36 downwardly from the recessed portion 38 side. The circumferential groove 37 is open upwardly and extends long in the circumferential direction in the shape of elliptical arc along the outer circumferential side of the fixing section 32.

The base section 36 is thinner in thickness than the inclined surface wall 35 due to the circumferential groove 37, so that the inclined surface wall 35 is easy to bend at the circumferential groove 37 as a starting point.

Therefore, as shown by a phantom line in the enlarged part of FIG. 9, when the extraordinary vibration is inputted, the relief valve 33 is able to be smoothly opened by the bending of the inclined surface wall 35 at the circumferential groove 37 as a starting point.

Since the thickness of the base section 36 has a great influence on the opening and closing movement of the relief valve 33, it is adjusted at an optimum level by adjusting the size and depth of the circumferential groove 37. As the thickness of the base section 36 becomes thinner, the relief valve 33 is able to be opened while bending by small force toward the fixing section 32 at the circumferential groove 37 as a starting point when it receives the hydraulic pressure from the lower side of the drawing.

On the other hand, the inclined surface wall 35 is formed relatively thick so as to increase the flexural rigidity to a certain extent. Therefore, the inclined surface wall 35 is set up such that it is not easily deformed by the hydraulic pressure from the primary liquid chamber side (the upper side of the drawing) at the time of closing the valve, whereby to provide high damping without leaking the hydraulic liquid.

Accordingly, when the valve is closed (at the time of no leak), the relief valve 33 has high rigidity so as to prevent the leak of the hydraulic liquid. Under the condition of occurrence of the cavitation when the extraordinary vibration is inputted, such a characteristic at the time of opening the valve that the inclined surface wall 35 is easy to bend so as to open the valve quickly to have the hydraulic liquid leaked is established by the variation in the circumferential direction of the valve length and the circumferential groove 37 in the base section 36.

Further, the adjustment of flexibility by the circumferential groove 37 can also be carried out by the relationship with the fixing base portion 39 which is a lower part continuous with the fixing section 32. Namely, the fixing base portion 39 is greater in thickness in the radial direction than the fixing section 32, and the outer circumferential surface 39a thereof extends more outwardly in the radial direction than the outer circumferential surface 32a of the fixing section 32.

Herein, when a perpendicular line abutting on an inner circumferential surface of the circumferential groove 37 (corresponding to the outer circumferential surface 32a of the fixing section 32) is L1, a perpendicular line abutting on an outer circumferential surface (an inner circumferential surface of the inclined surface wall 35 facing the circumferential groove 37) of the circumferential groove 37 is L2, a perpendicular line passing through the bottom center 37a of the circumferential groove 37 is L3, and a perpendicular line abutting on the outer circumferential surface 39a of the fixing base portion 39a is L4, the perpendicular line L3 passes through a center side relative to the outer circumferential surface 39a of the fixing base portion 39.

With this configuration, since the lower surface base portion 36a is located in the vicinity of the perpendicular line L3, namely, in the vicinity of the bottom center 37a of the circumferential groove 37, the valve can be opened in the state of the rigidity of the inclined surface wall 35 being set up at the optimum size for maintaining the high damping. The position of the lower surface base portion 36a is optimum when being located on the perpendicular line L3. However, when the perpendicular line L4 is located between the lines L3 and L2, a certain amount of effect is able to be obtained in the balance between the rigidity of the relief valve 33 and the optimum valve opening characteristic.

By the way, when the perpendicular line L4 is located on the side of the line L1 relative to the line L3, the valve is easily opened, and the leak is easily caused also at the time of the normal vibration input which is not the extraordinary vibration input. In addition, when the perpendicular line L4 is located on the outside in the radial direction of the line L2, the valve is hard to be opened whereby it is difficult to prevent the cavitation.

Next, the variation of the valve length in the longitudinal direction of the relief valve 33 will be described.

Figure 10:
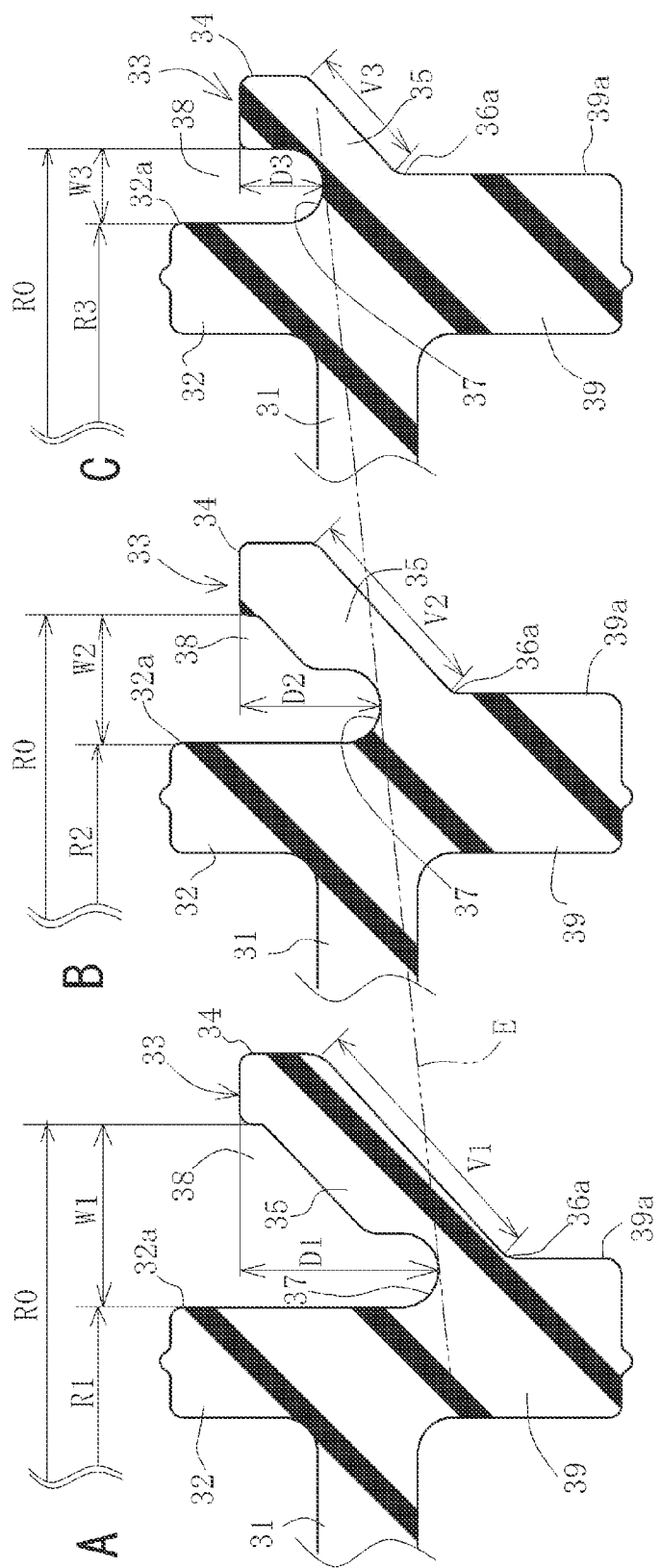
FIG. 10 is an enlarged cross sectional view of an essential part of a relief valve.

FIG. 10 is a partial cross sectional view showing the variation of the valve length of the relief valve 33, in which FIG. 10A is a cross section taken along line 10A-10A of FIG. 7, FIG. 10B is a cross section taken along line 10B-10B thereof, and FIG. 10C is a cross section taken along line 10C-10C thereof.

First, in FIG. 10A, this cross sectional part is taken along the middle portion P in the longitudinal direction of the relief valve 33. Although the radius R0 of the distal end portion 34 is constant in the full circumference, the radius R1 of the fixing section 32 is smallest and the opening width W1 of the recessed portion 38 is largest. In addition, the depth D1 of the recessed portion 38 is largest.

Therefore, since the valve length V1 becomes longest, this part is most flexible. Herein, the bottom line E in the drawing is a line connecting the bottom centers 37a of the circumferential groove 37 in the longitudinal direction. The bottom line E is a straight line in parallel with a line connecting the lower surface base portions 36a in the circumferential direction and extends while rising steadily from left to right in the drawing, and the bottom center 37a of the circumferential groove 37 is located on this straight line. The depth of the recessed portion 38 is gradually shallowed along the bottom line E from the middle portion in the circumferential direction (FIG. 10A) to each end part in the circumferential direction (FIG. 10C).

Next, in FIG. 10B, this cross sectional part is taken along an intermediate portion between the middle portion P in the longitudinal direction of the relief valve 33 and the end portion Q in the longitudinal direction thereof. The radius R2 of the fixing section 32 is larger than R1, and the opening width W2 and the depth D2 of the recessed portion 38 are smaller than W1 and D1, respectively. Therefore, the valve length V2 is shorter than V1 whereby to be harder to bend at this part.

Further, in FIG. 10C, this cross sectional part is taken along a neighboring portion of the end portion Q in the longitudinal direction. The radius R3 of the fixing section is largest. The opening width W3 and the depth D3 of the recessed portion 38 are smallest, respectively (R1<R2<R3; W1>W2>W3; D1>D2>D3).

Therefore, the valve length becomes shortest (V1>V2>V3), whereby this part is most difficult to bend.

By the way, the variation of the valve length V and the variation of the opening width W show substantially the same inclination. Accordingly, the variation in the longitudinal direction of the valve length will be apparent from the fact that the relief valve 33 is of crescent shape so as to vary in the opening width.

Next, the operation of this embodiment will be described mainly with reference to FIGS. 5, 9 and 10. In FIG. 5, when the extraordinary vibration is inputted from the Z direction, the primary liquid chamber 5 is compressed and the hydraulic liquid is sent out to the side of the secondary liquid chamber 7. At that time, the hydraulic liquid of the primary liquid chamber 5 is pressurized to thereby push the upper surface of the inclined surface wall 35 of the relief valve 33 downwardly to the secondary liquid chamber 7 side. However, since the inclined surface wall 35 of the relief valve 33 is formed with a certain amount of thickness and the high rigidity, and configured not to cause the valve opening deformation by the hydraulic pressure level due to the vibration input of the predetermined normal range, the sealing contact of the seal surface 34a of the distal end portion 34 relative to the seat surface 23a is maintained so as to prevent the leak of the hydraulic liquid (see the enlarged part of FIG. 4), so that it is possible to strengthen the liquid column resonance by the orifice passage 8 and to provide the high damping.

Moreover, since the lower surface of the inclined surface wall 35 is supported by the stopper 26 (see FIG. 5), the deformation of the relief valve 33 can be stopped in such a way as to prevent the inclined surface wall 35 from being pressed downwardly into the secondary liquid chamber 7 side even if the hydraulic pressure on the primary liquid chamber 5 side is higher to a certain extent. Therefore, the leak of the hydraulic liquid can be prevented also in this way. Similarly, when the extraordinary vibration is inputted, the deformation of the relief valve 33 is stopped due to the support of the stopper 26 whereby to make it possible to prevent the leak.

Further, when the stopper 26 is provided in the vicinity of the middle portion P in the longitudinal direction, the valve opening deformation of the inclined surface wall 35 at the most deformable middle portion in the longitudinal direction of the relief valve 33 can be prevented.

Moreover, when the stopper 26 is provided also in the intermediate portion between the middle portion P in the longitudinal direction and the end portion Q in the longitudinal direction so as to provide plural stoppers, the relief valve 33 can be supported accurately. Accordingly, even if the relief valve 33 is formed long such as to have the length a little less than about a half length of the full circumference of the outer peripheral portion of the elastic partition member 30, the leak from the primary liquid chamber 5 side can be prevented.

After that, when the vibration direction is reversed and the volume of the primary liquid chamber 5 returns to the condition before compression, the hydraulic liquid moves from the secondary liquid chamber 7 via the Orifice passage 8 to the primary liquid chamber 5. At that time, although the hydraulic pressure is imposed on the relief valve 33 from the secondary liquid chamber 7 side, the relief valve 33 has the rigidity of such degree that it is not opened by the vibration input in the normal range. Therefore, the seal surface 34a maintains the sealing contact with the seat surface 23a, so that the leak of the hydraulic liquid flowing from the secondary liquid chamber 7 to the primary liquid chamber 5 can be prevented.

On the other hand, when the extraordinary vibration is inputted, the volume of the primary liquid chamber 5 returns quickly to the condition before compression by the reverse of the vibration direction, whereby the inside of the primary liquid chamber 5 approaches a negative pressure condition instantaneously.

Therefore, the relief valve 33 is pulled from the primary liquid chamber 5 side and pushed up by the hydraulic liquid from the secondary liquid chamber 7 side. When this power overcomes the rigidity of the relief valve 33, the relief valve 33 is deformed to the valve opening position so as to allow the seal surface 34a to be brought out of contact with and separated away from the seat surface 23a, so that the hydraulic liquid on the secondary liquid chamber 7 side is leaked from the secondary liquid chamber 7 via the leak hole 29, the leak passage 49 and the leak hole 19 to the primary liquid chamber 5 (the secondary liquid chamber 7→the leak hole→the leak passage 49→the leak hole 19→the primary liquid chamber 5).

With the above construction, the large amount of the hydraulic liquid can be leaked smoothly from the leak hole 19 to the primary liquid chamber 5 whereby the generation of the cavitation phenomenon within the primary liquid chamber 5 can be suppressed steadily.

Then, since the relief valve 33 is formed long in the shape of substantially semi-elliptic circular arc having about a half length of the full circumference of the outer peripheral portion of the elastic partition member 30 and since the valve length varies in the circumferential direction in such a manner that it is largest at the middle portion P in the longitudinal direction of the relief valve 33, the middle portion in the circumferential direction is configured to be opened first.

When the relief valve 33 is opened at a single location in the longitudinal direction thereof, the hydraulic liquid is concentrated in this location. Therefore, the hydraulic liquid pushes open the part adjacent to the location having been opened, and the opening of the relief valve 33 is expanded quickly toward the end portions Q in the longitudinal direction thereof, so that substantially the whole of the relief valve 33 can be opened exceedingly in a short time.

Accordingly, when the middle portion P in the longitudinal direction of the relief valve 33 is brought first out of contact as a valve opening starting portion, the inclined surface wall 35 is bent to open the valve in such a way as to be turned over toward both the ends Q in the longitudinal direction from the middle portion P as a starting point.

Therefore, the relief valve 33 is opened smoothly all over its length whereby the quick and steady valve opening operation can be performed.

Particularly, since the middle portion P in the longitudinal direction of the relief valve 33 which is essentially low in rigidity is greatest in the valve length, this part is allowed to serve surely as the valve opening starting part. In addition, since the inclined surface wall 35 is of inclined surface shape and the hydraulic liquid on the secondary liquid chamber 7 side is guided by the inclined surface and concentrated in the distal end of the relief valve 33, the distal end side of the relief valve 33 is deformed in such a way as to be tuned over so that the seal surface 34a can be smoothly brought out of contact with and moved away from the seat surface 23a.

Further, since the inclined surface wall 35 has the relatively high rigidity and the distal end portion 34 is formed with thicker wall thickness and higher rigidity, the local and irregular elastic deformation in the longitudinal direction of the relief valve 33 is prevented, and the whole of the relief valve 33 can be deformed continuously.

Moreover, since the circumferential groove 37 is provided to extend in the circumferential direction, the inclined surface wall 35 can be bent smoothly at the circumferential groove 37 as the starting point.

For this reason, the relief valve 33 can be opened quickly substantially all over its length whereby the leak can be produced at the whole outer circumferential portion of the relief valve 33.

At that time, when the lower surface base portion 36a is located in an intermediate position between the bottom center 37a of the circumferential groove 37 and the outer circumferential surface 35a of the circumferential groove 37, it is possible to optimize the balance between the relatively high rigidity and the flexibility of the inclined surface wall 35.

Further, since the relief valve 33 is located on the inner circumferential side of the annular partition wall 23 and has a long circumferential length so as to form a large opening area, the large amount of the hydraulic liquid can be leaked instantaneously whereby the generation of the cavitation phenomenon can be surely suppressed.

Like this, the increase in rigidity and the valve opening easiness which are contrary to each other are balanced and the relief valve 33 is able to have both the rigidity such as not to be deformed at the time of the normal vibration input in order to prevent the leak, and the valve opening easiness such as to be quickly deformed at the time of the extraordinary vibration input in order to make possible a large amount of leak.

Further, since the relief valve 33 is of crescent shape in a plan view and has about a half length of the full circumference of the outer peripheral portion of the elastic partition member 30, the relief valve 33 can be formed long in the circumferential direction of the leak passage 49, and the opening area can be widened so as to enable the large amount of the leak when the relief valve 33 is opened.

Further, since the valve length of the relief valve 33 varies in the longitudinal direction in such a manner that it is largest at the middle portion P in the longitudinal direction so as to endure the valve opening easiness and smallest at each end portion Q in the longitudinal direction so as to heighten the rigidity, the relief valve 33 can ensure the valve opening easiness while maintaining the high rigidity all over its length. Accordingly, also in the case where the relief valve 33 is lengthened and the opening area at the time of valve opening is widened so as to realize the large amount of the leak of the hydraulic liquid, the rigidity and the valve opening easiness can be surely provided at the same time.

Further, although the leak passage 49 is formed in a crescent shape thereby allowing the opening area thereof to be widened, the movable diaphragm section 31 can be formed in the elliptical shape so as to ensure a required area, since the inner circumferential side of the leak passage 49 is of elliptical arc shape. Therefore, it is possible to maintain the hydraulic pressure absorption performance without decreasing an area of the movable diaphragm section 31. Moreover, since the outer circumference of the elastic partition member 30 is a circular shape as it has been and there is no change in the outer radius R0, the device can be prevented from increasing in size without increasing the outer diameter of the partition member 6, whereby it is possible to keep the outer diameter compact.

FIG. 11 is a graph showing a dynamic spring characteristic, in which the horizontal axis is cavitation noise conduction force (N), and the vertical axis is damping force (N·s/mm). The cavitation noise conduction force is an index indicating a size of the noise at the time of the cavitation, which is conducted to the vehicle body side, and indicates that the cavitation can be suppressed as the numerical value is small.

A solid line in the drawing is a characteristic of the present invention, and a dashed line is a comparative example. The comparative example is shown below the graph as A, and has the relief valve 33 formed simply in a circular shape, in comparison with the present invention B having the relief valve 33 of elliptical arc shape. The number and length of the relief valve are identical.

From this graph, the damping force in the present invention and the comparative example each forms a straight line which increases continuously and extends substantially in parallel in relation to the cavitation noise conduction force. However, at the time of the same cavitation noise conduction force, the damping force of the present invention is greater than that of the comparative example, and it will be apparent that the present invention provides the higher damping and is able to suppress the cavitation more effectively with respect to the comparative example. This shows that the rigidity of the relief valve and the flexibility at the time of suppressing the cavitation are well balanced.

By the way, the present invention is not limited to each of the above embodiments, and various changes and modifications may be made in the invention without departing from the spirit and scope thereof. For instance, as a construction facilitating the valve opening easiness, there is an example shown in FIG. 12. FIG. 12A is a cross sectional view of the relief valve 33 corresponding to the enlarged part of FIG. 9, and FIG. 12B is a cross sectional view taken along line B-B of FIG. 12A.

Hereunder, it will be described by using another reference characters for different parts only.

In this example, there is provided a radial groove 40 on the upper surface of the inclined surface wall 35 which is the surface on the primary liquid chamber 5 side. This radial groove 40 is open toward the primary liquid chamber 5 and formed in such a way as to extend from the upper surface into the thick wall. The radial groove 40 is a recessed groove extending in the radial direction of the relief valve 33 and has an inward end portion reaching the circumferential groove 37 and an outward end portion reaching the distal end portion 34. The location for forming the radial groove 40 is the location passing through the middle portion P in the longitudinal direction of the relief valve 33 and its neighboring region. A plurality of radial grooves may be provided.

With provision of the radial groove 40 as above, the valve opening easiness in the vicinity of the middle portion P in the longitudinal direction can be facilitated. Namely, as shown in FIG. 12B, when the extraordinary vibration is inputted, the inclined surface wall 35 is pulled from the primary liquid chamber 5 side and the hydraulic pressure is imposed on it from the secondary liquid chamber 7 side. Then, although the hydraulic liquid on the secondary liquid chamber 7 side pushes the inclined surface wall 35 to the primary liquid chamber 5 side, as shown by an arrow a, a part in which the radial groove 40 is provided is deformed in such a way as to bend at the radial groove 40 as a center toward the primary liquid chamber 5 as shown by an arrow b, since the radial groove 40 is thinner and flexible. This deformation reaches the distal end portion 34. Therefore, the seal surface 34a of the distal end portion 34 located in the vicinity of the radial groove 40 is brought easily out of contact with the seat surface 23a, so that the valve is quickly opened, thereby making it possible to facilitate the valve opening easiness in this part.

FIG. 13 shows another example for facilitating the valve opening easiness, in which FIG. 13A corresponds to FIG. 12A. In this example, the inclined surface wall 35 is pushed up to the primary liquid chamber 5 side by a stopper 26 for supporting the lower surface of the inclined surface wall 35 which is the surface located on the secondary liquid chamber 7 side.

FIG. 13B is a cross sectional view taken along line B-B of FIG. 13A. As shown in this drawing, a support surface 26a of the stopper 26 is formed of a curved surface convexed toward the primary liquid chamber 5.

Therefore, the stopper 26 is configured to support the lower surface of the inclined surface wall 35 while pushing forward in order to push up the same to the primary liquid chamber 5 side in such a manner that a distal end of the support surface 26 bites into the lower surface of the inclined surface wall 35. This pushing forward type support is performed from an initial condition, namely, from a condition of no vibration input.

Since the support surface 26a is formed of the curved surface, only the distal end thereof comes in contact with the inclined surface wall 35 in a small range substantially in the form of line contact, and a slight gap 41 is formed between the support surface 26a excluding this contact portion and the lower surface of the inclined surface wall 35. This gap 41 has substantially a wedge shaped cross section which is tapered toward the contact portion between the support surface 26a and the lower surface of the inclined surface wall 35.

Then, when the extraordinary vibration is inputted and the hydraulic pressure is imposed on the inclined surface wall 35 from the secondary liquid chamber 7 side, the hydraulic liquid on the secondary liquid chamber 7 side pushes the inclined surface wall 35 toward the primary liquid chamber 5 side as shown by arrows a. However, a portion of the hydraulic liquid is directed into the gap 41 and pushes up the inclined surface wall 35 in such a way as to pull the same away from the support surface 26a.

Therefore, the inclined surface wall 35 is deformed at the support portion by the stopper 26 so as to bend to the primary liquid chamber 5 side, and, by this deformation, the seal surface 34a of the distal end portion 34 becomes easy to be separated from the seat surface 23a and is quickly brought out of contact therewith. At that time, since the support surface 26 of the stopper 26 contacts the inclined surface wall 35 in a small area substantially in the form of line contact, the friction is diminished and the surface 26 is easily brought out of contact. In addition, in the initial condition, the inclined surface wall 35 is biased and pushed forward to the primary liquid chamber 5 side, whereby to be easily brought out of contact.

Thus, the valve opening easiness in a region supported by the stopper 26 can be facilitated.

By the way, this construction may also be applied to the former example of FIG. 12 which has the radial groove.

Next, a second embodiment of the elastic partition member will be described. Herein, since, in this embodiment, mainly a part of the relief valve is modified and other component elements are identical to the previously described embodiment, like elements are given like reference characters and repeated description will be omitted.

Figure 14:
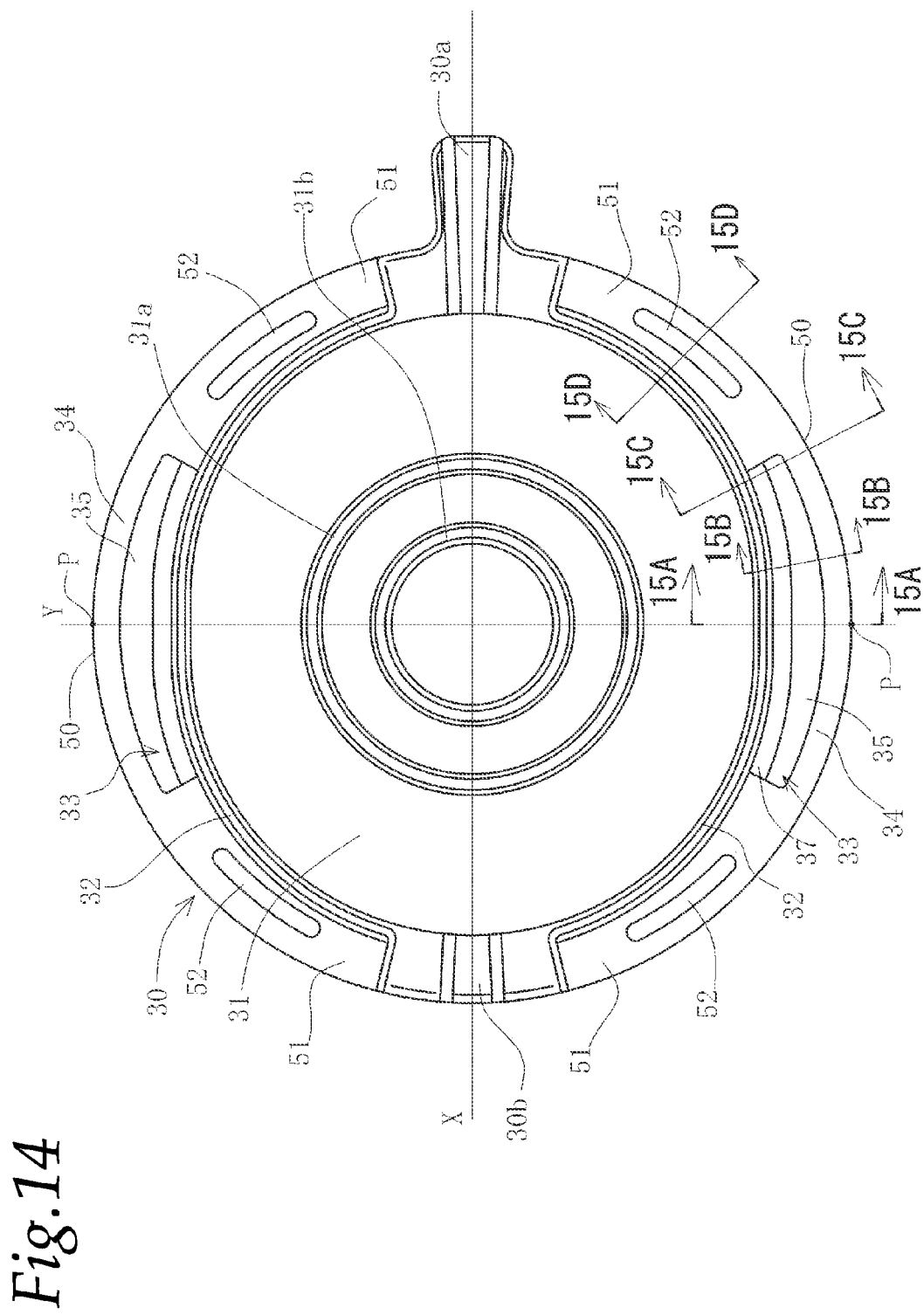
FIG. 14 is a plan view similar to FIG. 7 in accordance with a second embodiment.
Figure 15:
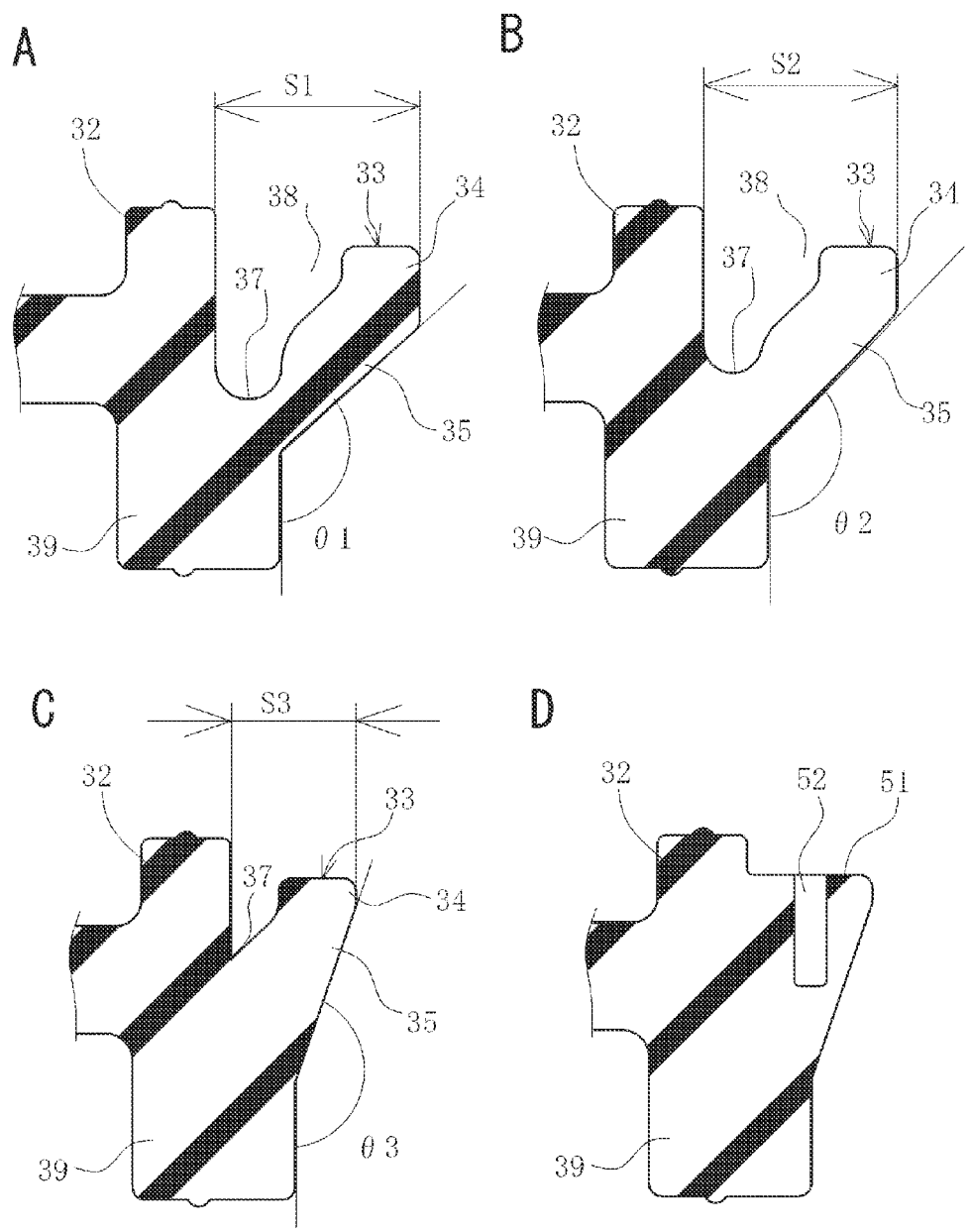
FIG. 15 is an enlarged cross sectional view similar to FIG. 10 in accordance with the second embodiment.

FIG. 14 is a plan view of the elastic partition member 30 corresponding to FIG. 7, and FIG. 15 is a cross sectional view of a modified part of the relief valve 33 similar to FIG. 10.

In this embodiment, as shown in FIG. 14, the relief valve 33 is shortened. In this embodiment, the relief valve 33 is formed in a circular arc shape of about ⅙ length of full circumference. However, the length of the relief valve 33 may be freely determined. This relief valve 33 is identical to the previously described embodiment in that curvatures of the outer circumferential side and the inner circumferential side of the relief valve 33 are different from each other and the valve length varies in the circumferential direction, and that the movable diaphragm section 31 is of elliptical shape.

Herein, an outer circumferential part of the elastic partition member 30 which is located outwardly of the fixing section 32 and between the positioning projection 30a and the thick wall end 30b shall be referred to as a valve region 50. In addition, two axes which intersect at right angles to a center of the elastic partition member 30 shall be referred to as X and Y. These axes X and Y are arranged such that, when the X axis passes through the positioning projection 30a and the thick wall end 30b, the middle portion P in the longitudinal direction of the relief vale 33 is located on the Y axis.

Although the relief valve 33 extends across the Y axis to both sides in the circumferential direction, the length in the circumferential direction of the relief valve 33 is relatively short, so that a valve non-forming part 51 is formed between the relief valve 33 and each of the positioning projection 30a and the thick wall end 30b.

The relief valve 33 in this embodiment is of shorter length in the circumferential direction than in the previous embodiment. With this construction, the elliptical end portion of high rigidity which extends to the valve non-forming part 51 in the previous embodiment is able to dispense with provision, so that in the normal condition the leak from this end portion can be prevented and the deterioration of the damping force can be prevented.

FIGS. 15A, 15B and 15C are cross sectional views of the relief valve 33 of FIG. 14, in which FIG. 15A is a cross sectional view taken along line 15A-15A, FIG. 15B is a cross sectional view taken along line 15B-15B, and FIG. 15C is a cross sectional view taken along line 15C-15C. When the valve length is indicated by the length between the fixing section 32 and each of outer circumferential surfaces of the distal end portions 34 of the relief valve 33, it varies in such a manner that the length S1 in FIG. 15A is largest, the length S3 in FIG. 15C is smallest, and the length S2 is intermediate (S1<S2<S3). The valve length varies in gradually shortening fashion from FIG. 15A to FIG. 15C. Namely, the relief valve 33 is identical to that of the previous embodiment in that the valve length varies such that the valve length of the middle portion in the circumferential direction is maximum and the valve length of the end portion in the circumferential direction is minimum.

In this embodiment, however, as shown in FIGS. 15A, 15B and 15C, without depending upon the variation of the depth of the circumferential groove 37 in the previous embodiment, the variation in valve length is achieved by a valve angle varying construction in a condition where the depth is constant. Namely, the valve angle which is formed by the outer circumferential surface of the fixing base portion 39 and the secondary liquid chamber 7 side surface of the inclined surface wall 35 is configured to vary. When the valve angle of FIG. 15A is θ1, the valve angle of FIG. 15B is θ2, and the valve angle of FIG. 15C is θ3, θ1<θ2<θ3. The valve angle gradually increases toward the end portion in the circumferential direction. Namely, the valve angle varying construction is established.

With this construction, the valve length can be varied so as to become longest at the middle portion in the circumferential direction. In addition, by having the valve angle varied, even if the valve length is varied, the height of the distal end portion of the relief valve can be kept constant.

Therefore, at the end portion in the circumferential direction, the valve length is smallest and the valve angle is largest, so that the bending when the relief valve 33 is opened can be minimized.

FIG. 15D is a cross sectional view taken along line 15D-15D of FIG. 14. The valve non-forming part 51 is a part of the valve region 50 in which the relief valve 33 is not formed and the recessed portion 38 for forming the relief valve 33 is not provided. In this part, there is formed an elastic force adjusting portion 52 for adjusting elastic force of the valve non-forming part 51.

This elastic force adjusting portion 52 is a circular arc shaped grooved recess in a plan view of FIG. 14. Although the elastic force adjusting portion 52 is open in the direction of the primary liquid chamber 5, it does not face the leak passage 49 and, unlike the recessed portion 38, does not form the relief valve 33. The elastic force adjusting portion

52 is provided for decreasing the rigidity of the valve non-forming part 51 and giving a proper amount of elastic force to this part. In this embodiment, the leak passage 49 is relatively short in the circumferential direction and formed only in a part overlapping with the relief valve 33 which is short in the circumferential direction. The leak passage 49 is not formed in a part overlapping with the valve non-forming part 51.

Further, the shape, size, depth and the like of the elastic force adjusting portion 52 may be optionally determined in accordance with the elastic force required for the valve non-forming part 51. However, the elastic force adjusting portion 52 is formed so as not to pass through the valve non-forming part 51 in the upward and downward direction of the drawing, and the opening thereof may be formed in the direction of the secondary liquid chamber 7 located below.

In the case where the elastic force adjusting portion 52 is not provided, the rigidity of the valve non-forming part 51 is heightened. Therefore, when this part is tightly fitted between the annular partition wall 23 of the lower holder 16 and the inner circumferential annular wall 24 (see FIG. 4), large reaction force accompanying the compression of the elastic body is generated in the movable diaphragm section 31. This reaction force acts on the movable diaphragm section 31 to thereby bend the same toward the secondary liquid chamber 7, so that there may be cases where the damping force required at the time of the normal condition is not able to be ensured.

However, when adjusting the elastic force by forming the elastic force adjusting portion 52 in the valve non-forming part 51, the generation of the large reaction force is suppressed whereby it is possible to prevent the bending beyond the requirement of the movable valve section 31.

In addition, it is also possible to maintain the damping performance by the above-referred short relief valve 33.

By the way, the present invention is not limited to each of the above embodiments, and various changes and modifications may be made in the invention without departing from the spirit and scope thereof. For instance, the configuration of the outer circumferential portion of the elastic partition member 30 in a plan view is not limited to a circular shape and may be a non-circular shape including an ellipse and a polygon. The third embodiment in which the outer circumferential portion of the elastic partition member 30 is of elliptical shape and the movable diaphragm section 31 is of circular shape is shown in FIG. 16.

Figure 16:
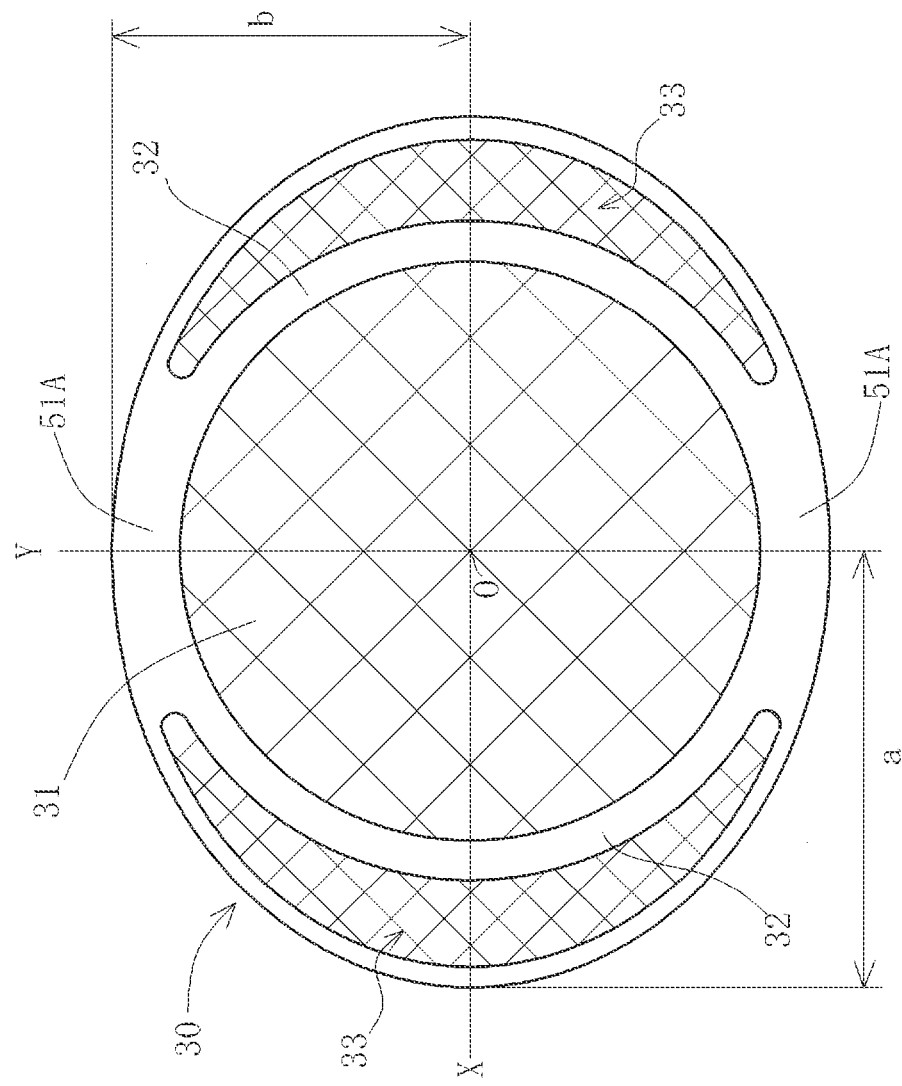
FIG. 16 is a plan view similar to FIG. 7 in accordance with a third embodiment.

FIG. 16 is a plan view schematically showing the elastic partition member 30, in which the elastic partition member 30 is of elliptical shape having a long radius a and a short radius b. The long radius a and the short radius b overlap each with two axes X and Y which lie at right angles to the center of the elastic partition member 30.

The movable diaphragm section 31, as shown by hatching, is arranged in a circular shape in a plan view on an inward side of the elastic partition member 30.

A space located between an inside of the outer circumferential portion of the elastic partition member 30 and an outside of the inner circumferential portion thereof is most widened at a part in the vicinity of the long radius a and most narrowed at a part in the vicinity of the short radius b. By utilizing this space, the relief valves 33 shown by hatching are provided in pairs in opposed relationship with respect to each other.

Each of the relief valves 33 is of crescent shape. A middle portion in the longitudinal direction of the relief valve 33 of which an opening width is largest is located on the long radius a, and the relief valve 33 extends from the middle portion to both ends in such a way as to be gradually narrowed in the opening width in the direction of the short axis b. Both ends in the longitudinal direction of the relief valve 33 is located in the vicinity of the short radius b, and inner and outer circumferences of the relief valve 33 are connected at these ends in a round shape. A length of each of the relief valve 33 is slightly shorter than about ½ (a half) of a full length of the outer circumferential portion of the elastic partition member 30.

With this construction, a pair of relatively long relief valves 33 of crescent shape can be provided by utilizing effectively the space which is formed between the outer circumferential portion of the elliptical elastic partition member 30 and the outer circumferential portion of the circular movable diaphragm section 31 and whose radial width varies in the circumferential direction. Then, a valve non-forming part 51A is formed between the ends in the longitudinal direction of the relief valves 33 in opposed relationship with respect to each other across the short axis b. In the case where the valve non-forming part 51A is larger to a certain extent, the elastic force adjusting portion (grooved recess) as shown in the second embodiment may be provided here.

Further, the non-circular movable diaphragm section as shown in the first and second embodiments may be combined with the non-circular elastic partition member. In this case, when the elastic partition member and the movable diaphragm section are formed in an elliptical shape, respectively, compression rates thereof may differ from each other.

Moreover, the elastic partition member and the movable diaphragm section may be formed in a circular shape, respectively, and the relief valve may be provided in a ring-shaped space formed between the elastic partition member and the movable diaphragm section. In this case, however, the valve length of the relief valve shall vary in the longitudinal direction as referred to above.

Further, in the case where the elastic partition member and the movable diaphragm section are formed in a non-circular shape, this non-circular shape is not limited to an elliptical shape. An oval shape, a polygonal shape, a combination of circle and ellipse with these, an irregular shape by having a small circular projection or recess provided around a large circle, or other various irregular shapes may be adopted, for instance.

Further, in the case where the relief valve is formed in a crescent shape in a plan view, one of the inner and outer circumferences thereof is an elliptical arc and the other is a circular arc, whereby the crescent shape can be easily formed. However, it is not limited to such combination between the elliptical arc and the circular arc, and it may be formed by having circular arcs different in curvature arranged in the inner and outer circumferences or by having circular arcs of the same curvature stacked with the edges out of line. In addition, the inner and outer circumferences may be formed by two elliptical arcs different in compression rate.

Further, the length of the relief valve is not limited to about ½ of a full length of the outer circumferential portion of the elastic partition member. A single relief valve extending along substantially the full length and a shorter relief valve extending along about ⅓ or ¼ of the full length may be adoptable.

What is claimed is:

1. A liquid sealed vibration isolating device comprising:
a liquid chamber using an elastic insulator as a part of its wall and being filled with hydraulic liquid,
a partition member partitioning the liquid chamber into a primary liquid chamber and a secondary liquid chamber,
an orifice passage communicating through the partition member between the primary liquid chamber and the secondary liquid chamber,
an elastic partition member being provided in the partition member,
an movable diaphragm section being integrally provided at a central portion of the elastic partition member so as to absorb hydraulic pressure fluctuation of the primary liquid chamber, and
a relief valve being integrally provided at an outer peripheral portion of the elastic partition member so as to open and close a leak passage provided in the partition member, the relief valve being configured to be opened when a vibration amplitude above a predetermined threshold is inputted, so as to leak the hydraulic liquid from the leak passage to the primary liquid chamber in order for suppressing generation of cavitation,
wherein the relief valve is formed along a circumferential direction of the outer peripheral portion of the elastic partition member and includes a valve recess which is open toward the primary liquid chamber and an inclined surface wall which forms an outer peripheral wall of the valve recess, and
wherein a valve length, which is a length in the radial direction of the inclined surface wall, varies in the circumferential direction of the relief valve in such a manner that the valve length is greatest at a middle portion in the circumferential direction of the relief valve.

2. The liquid sealed vibration isolating device according to claim 1, wherein
an opening width of the recess varies in the circumferential direction of the relief valve in such a manner that the opening width is largest at a middle portion in the circumferential direction of the relief valve.

3. The liquid sealed vibration isolating device according to claim 1, wherein the relief valve has a crescent shape in a plan view of the elastic partition member.

4. The liquid sealed vibration isolating device according to claim 1, wherein the relief valve is formed of two different curved lines of which one of inner and outer circumferential sides is an elliptic arc and the other is a circular arc, in a plan view of the elastic partition member.

5. The liquid sealed vibration isolating device according to claim 1, wherein the movable diaphragm section of the elastic partition member is of non-circular shape.

6. The liquid sealed vibration isolating device according to claim 1, wherein there is provided a thick-wall end of the outer circumferential portion of the elastic partition member formed in a part on the opposite side of the position projection; and,
wherein the relief valve is formed between the position projection and the thick wall end, which are provide in the outer circumferential portion of the elastic partition member, and a second relief valve is arranged in a symmetrical fashion with the first relief valve with respect to a center of the elastic partition member.

7. The liquid sealed vibration isolating device according to claim 1, wherein the elastic partition member includes a fixing section, which is thicker than the movable diaphragm section and the relief valve, provided for fixing the outer peripheral portion of the movable diaphragm section, and an outer circumferential part of the fixing section defines a valve region in which the relief valve is formed, and wherein a valve non-forming part is arranged in the vicinity of each end in the circumferential direction of the relief valve in the valve region, and an elastic force adjustment section for adjusting elastic force of the valve non-forming part is provided in the valve non-forming part.

8. The liquid sealed vibration isolating device according to claim 1, further comprising a radial groove being open to the primary liquid chamber and extending in the radial direction, wherein the radial groove is provided on a surface of the inclined surface wall facing the primary liquid chamber.

9. The liquid sealed vibration isolating device according to claim 1, wherein a surface of the inclined surface wall located on the secondary liquid chamber side is supported by a stopper formed within the leak passage, and the stopper is configured to push forward the inclined surface wall through a supporting portion thereof in the direction of the primary liquid chamber in an initial position thereof.

10. The liquid sealed vibration isolating device according to claim 1, wherein the elastic partition member includes a fixing section, which is thicker than the movable diaphragm section and the relief valve, for fixing the outer peripheral portion of the movable diaphragm section, the inclined surface wall of the relief valve extends integrally and outwardly in the radial direction from the fixing section and has a base section which is connected to the fixing section of the incline surface wall, and a circumferential groove of arc shape extending in the circumferential direction is formed in a surface on the primary liquid chamber side of the base section, and wherein a fixing base portion which is thicker than the fixing section is connected continuously integral with the fixing section and extends from the base section to the secondary liquid chamber side, and an outer circumferential surface of the fixing base portion is located outwardly in the radial direction with respect to a bottom center of the circumferential groove.

* * * * *